United States Patent
Suzuki et al.

(10) Patent No.: US 10,363,744 B2
(45) Date of Patent: *Jul. 30, 2019

(54) FLUID EJECTION APPARATUS

(71) Applicant: BROTHER KOGYO KABUSHIKI KAISHA, Nagoya-shi, Aichi-ken (JP)

(72) Inventors: Shuhei Suzuki, Nagoya (JP); Takashi Kanzaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,417

(22) Filed: Dec. 28, 2017

(65) Prior Publication Data

US 2018/0201016 A1    Jul. 19, 2018

Related U.S. Application Data

(63) Continuation of application No. 15/464,544, filed on Mar. 21, 2017, now Pat. No. 9,889,663.

(30) Foreign Application Priority Data

Mar. 31, 2016 (JP) ................. 2016-071043

(51) Int. Cl.
   *B41J 2/145* (2006.01)
   *B41J 2/14* (2006.01)
   (Continued)

(52) U.S. Cl.
   CPC ............ *B41J 2/145* (2013.01); *B41J 2/1433* (2013.01); *B41J 2/2132* (2013.01); *B41J 2/2146* (2013.01); *G06K 15/107* (2013.01)

(58) Field of Classification Search
   CPC ........ B41J 2/2146; B41J 2/2132; B41J 2/145; B41J 2/1433; B41J 2/15; B41J 2/155; B41J 2002/14475
   See application file for complete search history.

(56) References Cited

U.S. PATENT DOCUMENTS 9,889,663 B2 *  2/2018  Suzuki ................. B41J 2/1433
2005/0128248 A1  6/2005  Wada et al.
(Continued)

FOREIGN PATENT DOCUMENTS

JP  2005-199692 A  7/2005
JP  2011-143712 A  7/2011

OTHER PUBLICATIONS

Notice of Allowance dated Oct. 3, 2017 from U.S. Appl. No. 15/464,544.

*Primary Examiner* — Kristal Feggins
(74) *Attorney, Agent, or Firm* — Scully, Scott, Murphy & Presser, PC

(57) ABSTRACT

A fluid ejection apparatus is disclosed. One apparatus includes a first head chip and a second head chip. The first head chip includes nozzle groups A1, A2, B1 and C. The second head chip includes nozzle groups D2, E1, E2 and F. The nozzle groups A1, A2, B1, C, D2, E1, E2 and F eject fluid at an average usage rates A1, A2, B1, C, D2, E1, E2 and F, respectively. The average usage rate A2 is smaller than the average usage rate A1. The average usage rate B1 is smaller than the average usage rate A1. The average usage rate C is smaller than the average usage rate A1. The average usage rate D2 is smaller than the average usage rate E2. The average usage rate E1 is smaller than the average usage rate E2. The average usage rate F is smaller than the average usage rate E2.

13 Claims, 10 Drawing Sheets

(51) Int. Cl.
    *B41J 2/21* (2006.01)
    *G06K 15/10* (2006.01)

(56) References Cited

U.S. PATENT DOCUMENTS

| 2010/0079527 | A1 | 4/2010 | Sanada |
| 2010/0118077 | A1 | 5/2010 | Kakutani |
| 2011/0141179 | A1 | 6/2011 | Hara |
| 2016/0279935 | A1 | 9/2016 | Yuda |

* cited by examiner

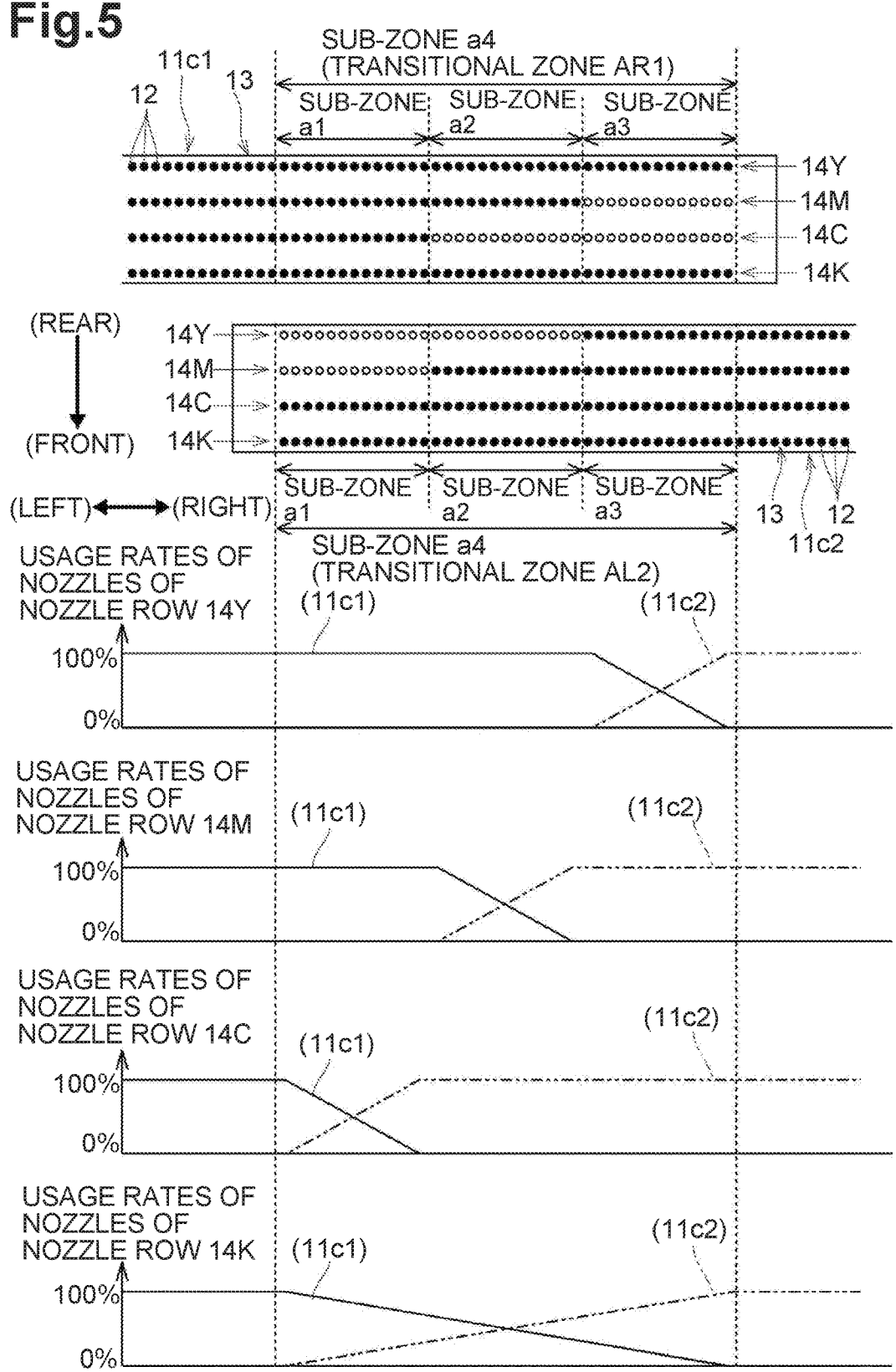

Fig.6

USAGE RATE TABLE

| | NOZZLE ROW | NON-TRANSITIONAL ZONE | SUB-ZONE a4 (TRANSITIONAL ZONE AR1) | | | | | | | | | | | | | | |
|---|---|---|---|---|---|---|---|---|---|---|---|---|---|---|---|---|---|
| | | | SUB-ZONE a1 | | | | SUB-ZONE a2 | | | | SUB-ZONE a3 | | | | |
| HEAD CHIP 11c1 | YELLOW | 100% | 100% | 100% | 100% | 100% | 100% | 100% | 100% | 100% | 100% | 75% | 50% | 25% | 0% |
| | MAGENTA | 100% | 100% | 100% | 100% | 100% | 100% | 75% | 50% | 25% | 0% | 0% | 0% | 0% | 0% |
| | CYAN | 100% | 100% | 75% | 50% | 25% | 0% | 0% | 0% | 0% | 0% | 0% | 0% | 0% | 0% |
| | BLACK | 100% | 92% | 85% | 78% | 70% | 62% | 54% | 50% | 46% | 38% | 30% | 23% | 15% | 8% |

| | NOZZLE ROW | | SUB-ZONE a4 (TRANSITIONAL ZONE AL2) | | | | | | | | | | | | | NON-TRANSITIONAL ZONE |
|---|---|---|---|---|---|---|---|---|---|---|---|---|---|---|---|---|
| | | | SUB-ZONE a1 | | | | SUB-ZONE a2 | | | | SUB-ZONE a3 | | | | | |
| HEAD CHIP 11c2 | YELLOW | 0% | 0% | 0% | 0% | 0% | 0% | 0% | 0% | 25% | 50% | 75% | 100% | | | 100% |
| | MAGENTA | 0% | 0% | 25% | 50% | 75% | 100% | 100% | 100% | 100% | 100% | 100% | 100% | | | 100% |
| | CYAN | 0% | 0% | 50% | 75% | 100% | 100% | 100% | 100% | 100% | 100% | 100% | 100% | | | 100% |
| | BLACK | 0% | 8% | 15% | 22% | 30% | 38% | 46% | 54% | 62% | 70% | 77% | 85% | 92% | | 100% |

Fig.10

USAGE RATE TABLE

| | NOZZLE ROW | NON-TRANSITIONAL ZONE | SUB-ZONE a4 (TRANSITIONAL ZONE AR1) | | | | | | | | | | | | | |
|---|---|---|---|---|---|---|---|---|---|---|---|---|---|---|---|---|
| | | | SUB-ZONE a1 | | | | SUB-ZONE a2 | | | | SUB-ZONE a3 | | | | | |
| HEAD CHIP 11c1 | YELLOW | 100% | 98% | 98% | 98% | 98% | 98% | 98% | 98% | 98% | 98% | 75% | 50% | 25% | 2% | |
| | MAGENTA | 100% | 98% | 98% | 98% | 75% | 50% | 25% | 2% | 2% | 2% | 2% | 2% | 2% | 2% | |
| | CYAN | 100% | 98% | 75% | 50% | 25% | 2% | 2% | 2% | 2% | 2% | 2% | 2% | 2% | 2% | |
| | BLACK | 100% | 92% | 85% | 78% | 70% | 62% | 54% | 50% | 46% | 38% | 30% | 23% | 15% | 8% | 0% |

| | NOZZLE ROW | SUB-ZONE a4 (TRANSITIONAL ZONE AL2) | | | | | | | | | | | | | | NON-TRANSITIONAL ZONE |
|---|---|---|---|---|---|---|---|---|---|---|---|---|---|---|---|---|
| | | SUB-ZONE a1 | | | | SUB-ZONE a2 | | | | SUB-ZONE a3 | | | | | | |
| HEAD CHIP 11c2 | YELLOW | 2% | 2% | 2% | 2% | 2% | 2% | 2% | 2% | 2% | 25% | 50% | 75% | 98% | 98% | 100% |
| | MAGENTA | 2% | 2% | 2% | 2% | 25% | 50% | 75% | 98% | 98% | 98% | 98% | 98% | 98% | 98% | 100% |
| | CYAN | 2% | 25% | 50% | 75% | 98% | 98% | 98% | 98% | 98% | 98% | 98% | 98% | 98% | 98% | 100% |
| | BLACK | 2% | 8% | 15% | 22% | 30% | 38% | 46% | 50% | 54% | 62% | 70% | 77% | 85% | 92% | 100% | ns # FLUID EJECTION APPARATUS

CROSS-REFERENCE TO RELATED APPLICATION

This application is a continuation application of U.S. Ser. No. 15/464,544 filed on Mar. 21, 2017 and claims priority from Japanese Patent Application No. 2016-071043 filed on Mar. 31, 2016, the contents of each of which is incorporated herein by reference in their entirety.

FIELD OF DISCLOSURE

The disclosure relates to a fluid ejection apparatus.

BACKGROUND

A known fluid ejection apparatus, e.g., an inkjet recording apparatus, includes a recording head. The recording head includes two head chips, each having a plurality of nozzle rows or arrays. Each nozzle row ejects a corresponding one of different color inks. The two head chips are arranged in a predetermined direction such that an overlap head zone (e.g., transition zone) is defined. The inkjet recording apparatus controllably ejects respective color inks from each of the head chips to the overlap head zone, to prevent print density unevenness from occurring at a portion of a recording sheet corresponding to the overlap head zone. The portion of a recording sheet corresponding to the overlap head zone may be referred to as the "portion A" of the recording sheet and other portion of the recording sheet corresponding to other zone of the recording head than the overlap head zone may be referred to as a "portion B" of the recording sheet. The inkjet recording apparatus uses nozzles of each nozzle row of the two head chips at predetermined respective usage rates across an entire portion of the overlap head zone.

SUMMARY

The inkjet recording apparatus switches the use of nozzles of each nozzle row of one head chip to nozzles of a corresponding nozzle row of another head chip in the entire portion of the overlap head zone. Such nozzle switching performed for all colors in the same portion of the overlap head zone may cause differing ink deposition orders between the portion A of the sheet and the other portion B of the sheet. The differing ink deposition orders may cause different hues between the portions A and B of the sheet, resulting in a deterioration or degradation of an image quality.

In one configuration, nozzles of each nozzle row of one head chip may be switched to nozzles of a corresponding nozzle row of another head chip at a respective one of different positions. This configuration may increase the overlap head zone defined by the two head chips. This may lead to increase in the number of head chips required for the recording head.

One or more aspects of the disclosure provide a fluid ejection apparatus that may reduce a width of a transition or an overlap head zone between two head chips while reducing a deterioration of quality of an image recorded on a recording medium. Another aspect of the disclosure provides a control method of the fluid ejection apparatus.

According to one aspect of the disclosure, a fluid ejection apparatus includes a first head chip extending from a first end in a first direction towards a second end in the first direction. The first head chip includes a nozzle row A comprising nozzles A arranged along the first direction, a nozzle row B comprising nozzles B arranged along the first direction and a nozzle row C comprising nozzles C arranged along the first direction. The fluid ejection apparatus includes a second head chip extending from a third end in the first direction towards a fourth end in the first direction. The second head chip includes a nozzle row D comprising a plurality of nozzles D arranged along the first direction, a nozzle row E comprising nozzles E arranged along the first direction, and a nozzle row F comprising nozzles F arranged along the first direction. The fluid ejection apparatus includes a controller configured to control the first head chip and the second head chip to eject fluid from the first head chip and the second head chip. The nozzle row B is positioned between the nozzle row A and the nozzle row D in a second direction orthogonal to the first direction. The nozzle row D is positioned between the nozzle row B and the nozzle row E in the second direction. The nozzles A of the nozzle row A are arranged into a nozzle group A1 and a nozzle group A2. The nozzle group A1 comprises some of the nozzles A. The nozzle group A2 comprises others of the nozzles A. The nozzle group A1 is positioned between the nozzle group A2 and the center of the first head chip in the first direction. The nozzles B of the nozzle row B are arranged into a nozzle group B1. The nozzle group B1 comprises some of the nozzles B. The nozzle group A1 and the nozzle group B1 are aligned along the second direction. The nozzles C of the nozzle row C are arranged into a nozzle group C. The nozzle group C comprises some of the nozzles C. The nozzle group A1 and a portion of the nozzle group C are aligned along the second direction. The nozzles D of the nozzle row D are arranged into a nozzle group D2. The nozzle group D2 of the nozzle row D comprises some of the nozzles D. The nozzle group A2 and the nozzle group D2 are aligned along the second direction. The nozzles E of the nozzle row E are arranged into a nozzle group E1 and a nozzle group E2. The nozzle group E1 comprises some of the nozzles E. The nozzle group E2 comprises others of the nozzles E. The nozzle group A1 and the nozzle group E1 are aligned along the second direction. The nozzle group A2 and the nozzle group E2 are aligned along the second direction. The nozzles F of the nozzle row F are arranged into a nozzle group F. The nozzle group F comprises some of the nozzles F. The nozzle group A1 and a portion of the nozzle group F are aligned along the second direction. The nozzle group C and the nozzle group F are aligned along the second direction. The controller is configured to control the nozzle group A1 to eject fluid at an average usage rate A1 that is an average of usage rates of the some of nozzles A comprising the nozzle group A1. The controller is configured to control the nozzle group A2 to eject fluid at an average usage rate A2 that is an average of usage rates of the others of nozzles A comprising the nozzle group A2. The controller is configured to control the nozzle group B1 to eject fluid at an average usage rate B1 that is an average of usage rates of the some of nozzles B comprising the nozzle group B1. The controller is configured to control the nozzle group C to eject fluid at an average usage rate C that is an average of usage rates of the some of nozzles C comprising the nozzle group C. The controller is configured to control the nozzle group D2 to eject fluid at an average usage rate D2 that is an average of usage rates of the some of nozzles D comprising the nozzle group D2. The controller is configured to control the nozzle group E1 to eject fluid at an average usage rate E1 that is an average of usage rates of the some of nozzles E comprising the nozzle group E1. The controller is configured to control the nozzle group E2 to eject fluid at an average usage rate E2 that is an average of usage rates of the others of nozzles E comprising the nozzle group E2. The controller is configured to control the nozzle group F to eject fluid at an average usage rate F that is an average of usage rates of the some of the nozzles F comprising the nozzle group F. The average usage rate A2 is smaller than the average usage rate A1. The average usage rate B1 is smaller than the average usage rate A1. The average usage rate C is smaller than the average usage rate A1. The average usage rate D2 is smaller than the average usage rate E2. The average usage rate E1 is smaller than the average usage rate E2. The average usage rate F is smaller than the average usage rate E2.

According to further aspect of the disclosure, a fluid ejection apparatus includes a first head chip extending from a first end in a first direction towards a second end in the first direction. The first head chip includes a nozzle row A comprising nozzles A arranged along the first direction, a nozzle row B comprising nozzles B arranged along the first direction, and a nozzle row C comprising nozzles C arranged along the first direction. The fluid ejection apparatus includes a second head chip extending from a third end in the first direction towards a fourth end in the first direction. The second head chip includes a nozzle row D comprising a plurality of nozzles D arranged along the first direction, a nozzle row E comprising nozzles E arranged along the first direction, and a nozzle row F comprising nozzles F arranged along the first direction. The fluid ejection apparatus includes a controller configured to control the first head chip and the second head chip to eject fluid from the first head chip and the second head chip. The nozzle row B is positioned between the nozzle row A and the nozzle row D in a second direction orthogonal to the first direction. The nozzle row D is positioned between the nozzle row B and the nozzle row E in the second direction. The nozzles A of the nozzle row A are arranged into a nozzle group A1 and a nozzle group A2. The nozzle group A1 comprises some of the nozzles A. The nozzle group A2 comprises others of the nozzles A. The nozzle group A1 is positioned between the nozzle group A2 and the center of the first head chip in the first direction. The nozzles B of the nozzle row B are arranged into a nozzle group B1. The nozzle group B1 comprises some of the nozzles B. The nozzle group A1 and the nozzle group B1 are aligned along the second direction. The nozzles C of the nozzle row C are arranged into a nozzle group C. The nozzle group C comprises some of the nozzles C. The nozzle group A2 and a portion of the nozzle group C are aligned along the second direction. The nozzles D of the nozzle row D are arranged into a nozzle group D2. The nozzle group D2 of the nozzle row D comprises some of the nozzles D. The nozzle group A2 and the nozzle group D2 are aligned along the second direction. The nozzles E of the nozzle row E are arranged into a nozzle group E1 and a nozzle group E2. The nozzle group E1 comprises some of the nozzles E. The nozzle group E2 comprises others of the nozzles E. The nozzle group A1 and the nozzle group E1 are aligned along the second direction. The nozzle group A2 and the nozzle group E2 are aligned along the second direction. The nozzles F of the nozzle row F are arranged into a nozzle group F. The nozzle group F comprises some of the nozzles F. The nozzle group A2 and a portion of the nozzle group F are aligned along the second direction. The nozzle group C and the nozzle group F are aligned along the second direction. The controller is configured to control the nozzle group A1 to eject fluid at an average usage rate A1 that is an average of usage rates of the some of nozzles A comprising the nozzle group A1. The controller is configured to control the nozzle group A2 to eject fluid at an average usage rate A2 that is an average of usage rates of the others of nozzles A comprising the nozzle group A2. The controller is configured to control the nozzle group B1 to eject fluid at an average usage rate B1 that is an average of usage rates of the some of nozzles B comprising the nozzle group B1. The controller is configured to control the nozzle group C to eject fluid at an average usage rate C that is an average of usage rates of the some of nozzles C comprising the nozzle group C. The controller is configured to control the nozzle group D2 to eject fluid at an average usage rate D2 that is an average of usage rates of the some of nozzles D comprising the nozzle group D2. The controller is configured to control the nozzle group E1 to eject fluid at an average usage rate E1 that is an average of usage rates of the some of nozzles E comprising the nozzle group E1. The controller is configured to control the nozzle group E2 to eject fluid at an average usage rate E2 that is an average of usage rates of the others of nozzles E comprising the nozzle group E2. The controller is configured to control the nozzle group F to eject fluid at an average usage rate F that is an average of usage rates of the some of the nozzles F comprising the nozzle group F. The average usage rate A2 is smaller than the average usage rate A1. The average usage rate B1 is smaller than the average usage rate A1. The average usage rate C is smaller than the average usage rate A1. The average usage rate D2 is smaller than the average usage rate E2. The average usage rate E1 is smaller than the average usage rate E2. The average usage rate F is smaller than the average usage rate E2.

BRIEF DESCRIPTION OF THE DRAWINGS

FIG. 5 illustrates fluid ejection processing at a transition between two head chips according to one or more aspects of the disclosure.

FIG. 6 illustrates a usage rate table according to one or more aspects of the disclosure.

FIG. 10 illustrates another usage rate table according to one or more aspects of the disclosure.

DETAILED DESCRIPTION

An illustrative embodiment and its modifications according to one or more aspects of the disclosure are described in detail with reference to the accompanying drawings. In the disclosure, a direction along a conveyance direction in which a recording sheet 100 is conveyed may be defined as a front-rear direction of a printer 1, as labelled in FIG. 1. A width or lateral direction of the printer 1 perpendicular to the conveyance direction may be defined as a left-right direction of the printer 1. A direction orthogonal to the front-rear direction and the left-right direction and extending into the page of FIG. 1 may be defined as a top-bottom or vertical direction of the printer 1.

<General Configuration of Printer>

Figure 1:
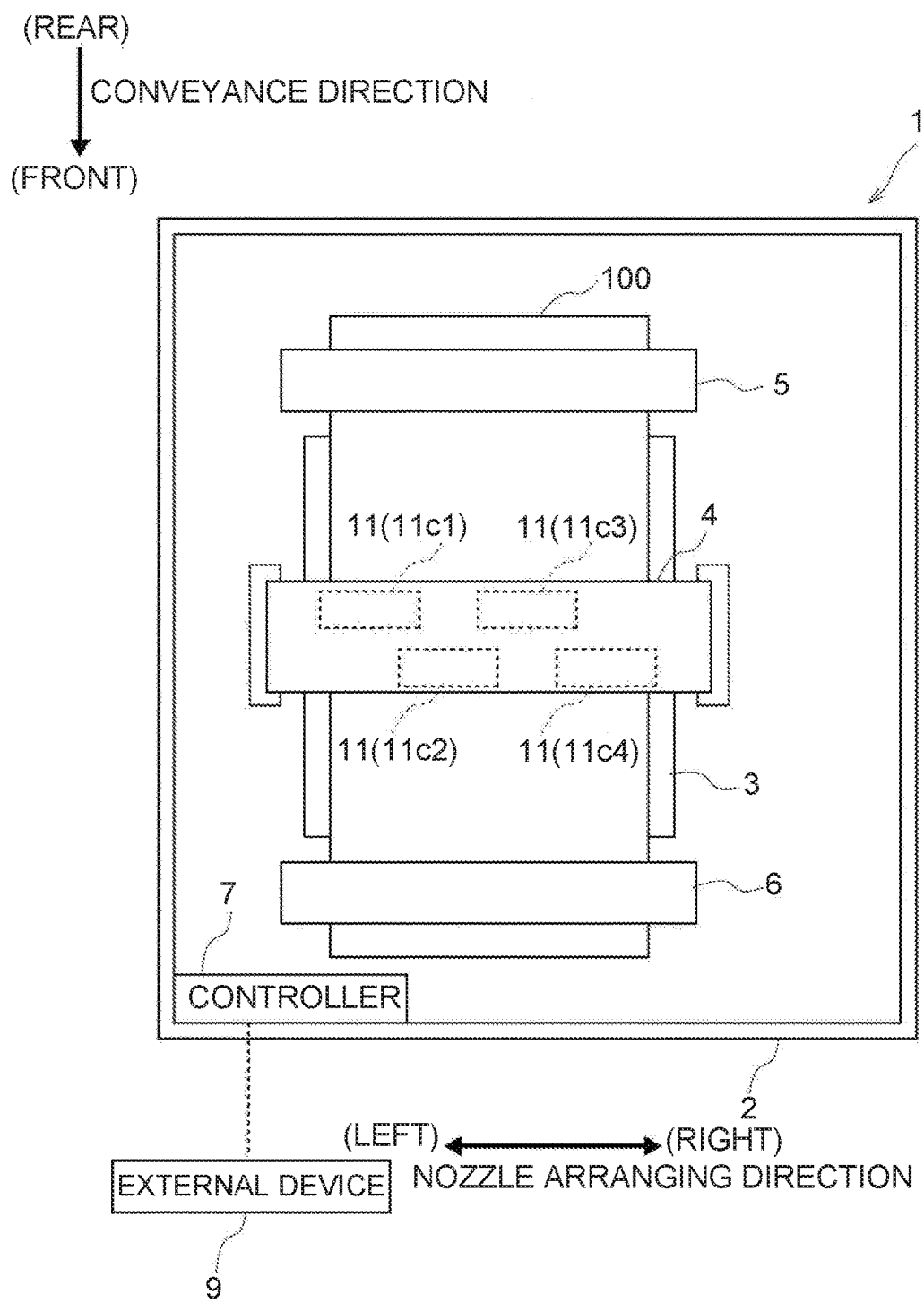
FIG. 1 is a schematic plan view of an inkjet printer in an illustrative embodiment according to one or more aspects of the disclosure.

As depicted in FIG. 1, the printer 1 includes a platen 3, an inkjet head 4, two conveyance rollers 5 and 6, and a controller 7, which are housed inside a casing 2 of the printer 1.

An upper surface of the platen 3 supports a recording sheet 100 being conveyed by the conveyance rollers 5 and 6. The conveyance rollers 5 and 6 are disposed behind and in front of the platen 3, respectively. Each of the conveyance rollers 5 and 6 is configured to be driven by a conveyance motor 8 (refer to FIG. 3). The rollers 5 and 6 may convey the recording sheet 100 toward the platen 3 or over the platen 3 in a forward direction.

The inkjet head 4 is disposed above the platen 3. The inkjet head 4 is configured to receive color inks (e.g., black, yellow, cyan, and magenta) from ink tanks (not depicted). In one example, the inkjet head 4 is capable of ejecting four colors of ink.

<General Configuration of Inkjet Head>

Figure 2:
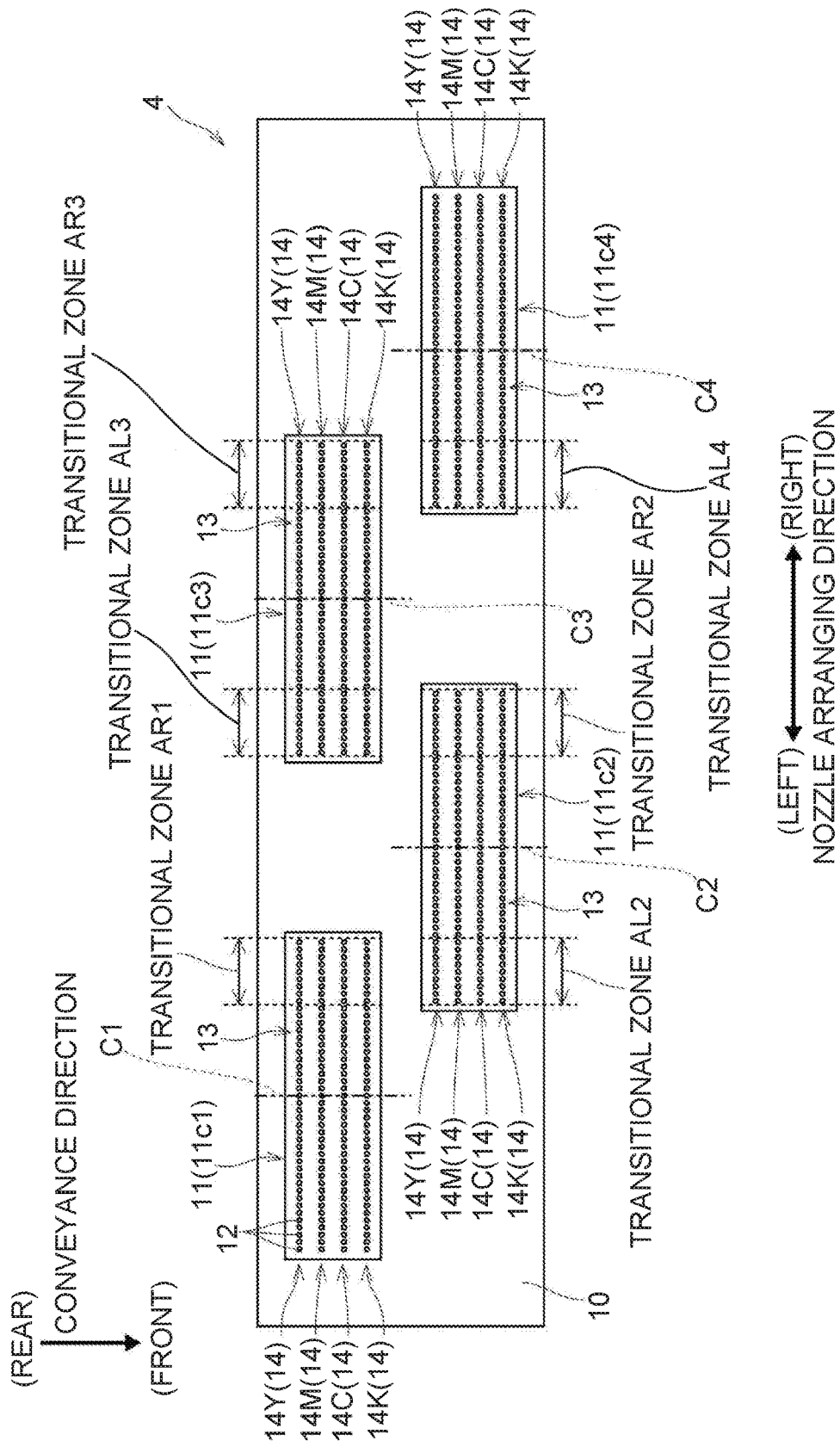
FIG. 2 is a plan view of an inkjet head of the inkjet printer according to one or more aspects of the disclosure.

The inkjet head 4 is now described in detail. As depicted in FIG. 2, the inkjet head 4 includes four head chips 11 arranged in the left-right direction. The head chips 11 are held in a chip holder 10.

Two head chips 11 are disposed on a front side while the other two head chips 11 are disposed on a rear side. Each of the four head chips 11 (e.g., the center thereof in the left-right direction) is disposed at a different position in the left-right direction. The four head chips 11 are arranged in a staggered adjacency to one another in the left-right direction.

Each of the four head chips 11 has the same or similar configuration. A head chip 11 includes a nozzle zone 13 on a lower surface thereof. The nozzle zone 13 has a plurality of nozzles 12 formed therein. In one example, multiple nozzles 12 are arranged along the left-right direction in the nozzle zone 13 into a nozzle row 14. The nozzle zone 13 includes, for example, four, nozzle rows 14. The four nozzle rows 14 are arranged along the conveyance direction.

The four nozzle rows 14 include nozzle rows 14Y, 14M, 14C and 14K. The nozzle row 14Y is configured to eject yellow ink; the nozzle row 14M is configured to eject magenta ink; the nozzle row 14C is configured to eject cyan ink, and the nozzle row 14K is configured to eject black ink. Each of the four nozzle rows 14 is configured to eject a different color of ink. Yellow, cyan, and magenta inks are primary color inks.

The nozzle rows 14Y, 14M, 14C, and 14K are arranged in this order from an upstream side in the conveyance direction (e.g., from the rear side). A pitch or spacing between adjacent nozzles 12 in the left-right direction may be the same in the nozzle rows 14Y, 14M, 14C and 14K.

The four head chips 11 include head chips 11c1, 11c2, 11c3, and 11c4. The head chip 11c1 is disposed leftmost and on the rear side. The head chip 11c4 is disposed rightmost and on the front side. The head chip 11c2 is disposed on the front side and such that a center C2 thereof in the left-right direction is positioned to the right of a center C1 of the head chip 11c1 in the left-right direction. The head chip 11c3 is disposed on the rear side and such that a center C3 thereof in the left-right direction is positioned to the left of a center C4 of the head chip 11c4 in the left-right direction. The center C2 of the head chip 11c2 is positioned to the left of the center C3 of the head chip 11c3.

The head chip 11c1 has a transitional zone AR1 at a right end portion of the nozzle zone 13 thereof. The head chip 11c2 has a transitional zone AL2 at a left end portion of the nozzle zone 13 thereof. Each of the transitional zones AR1 and AL2 has the same number of the nozzles 12. The head chips 11c1 and 11c2 are arranged such that the transitional zones AR1 and AL2 are aligned along the conveyance direction, defining an overlap head zone. The transitional zones AR1 and AL2 are aligned along the conveyance direction. The nozzles 12 of the nozzle rows 14 within the transitional zone AR1 of the head chip 11c1 may align with the nozzles 12 of the nozzle rows 14 within the transitional zone AL2 of the head chip 11c2, in the conveyance direction. It is to be noted that manufacturing or assembling deviations of the head chips 11c1 and 11c2 may cause the nozzles 12 in the transitional zones AR1 and AL2 to be slightly misaligned from each other.

The head chip 11c2 also has a transitional zone AR2 at a right end portion of the nozzle zone 13 thereof. The head chip 11c3 has transitional zones AL3 and AR3, respectively, at left and right end portions of the nozzle zone 13 thereof. The head chip 11c4 has a transitional zone AL4 at a left end portion of the nozzle zone 13 thereof. The relationship between the transitional zones AR1 and AL2, with respect to the number of the nozzles 12, positions of the nozzles 12 in the left-right direction, and positional relation with respect to the conveyance direction, is applied to the transitional zones AR2 and AL3, and the transitional zones AR3 and AL4.

The four head chips 11 are arranged such that the transitional zones of two head chips 11 (e.g., 11c1 and 11c2; 11c2 and 11c3; and 11c3 and 11c4) are aligned along conveyance direction, defining an overlap head zone. In other words, the transitional zones AR1 and AL2 of the head chips 11c1 and 11c2, respectively, define an overlap head zone; the transitional zones AR2 and AL3 of the head chips 11c2 and 11c3, respectively, define another overlap head zone; and the transitional zones AR3 and AL4 of the head chips 11c3 and 11c4, respectively, define still another overlap head zone. The four head chips 11, each having the evenly spaced nozzles 12 in the left-right direction, constitute one line head.

Figure 3:
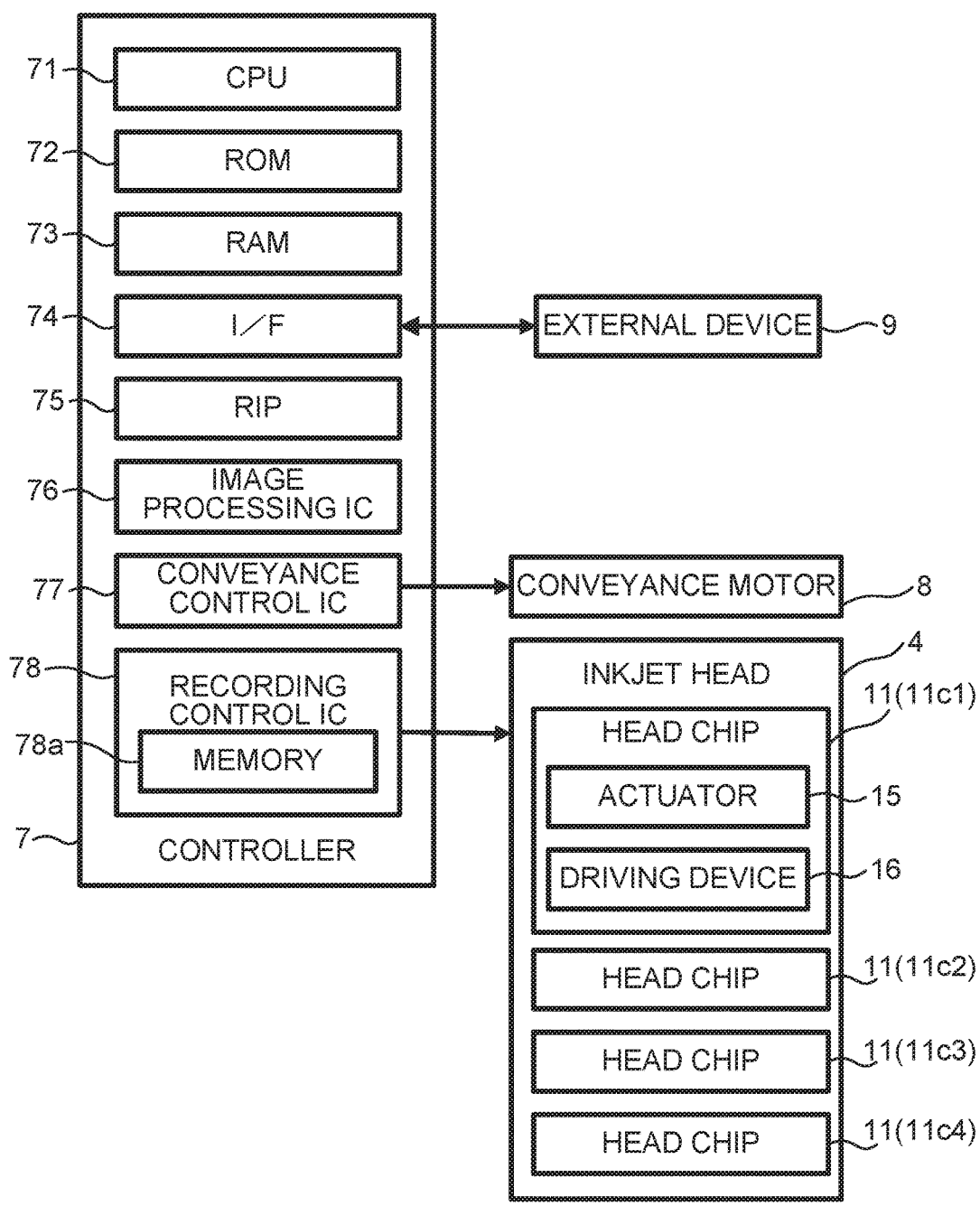
FIG. 3 is a block diagram illustrating an electrical configuration of the inkjet printer according to one or more aspects of the disclosure.

As depicted in FIG. 3, each of the head chips 11 includes an actuator 15 and a driving device 16. The actuator 15 includes a plurality of actuator elements for ejecting ink from the respective nozzles 12. The driving device 16 is configured to individually drive the actuator elements. The actuator 15 is not limited to a specific type. In one example, the actuator 15 may be a piezoelectric actuator including piezoelectric elements as actuator elements. The piezoelectric elements may pressurize ink using deformation of a piezoelectric layer thereof with inverse piezoelectric effect. In another example, an actuator element may be a heating element that generates bubbles in ink with heat. The driving device 16 is configured to perform digital-to-analog conversion of ejection data (to be described below) transmitted from the controller 7 into analog ejection signals. The driving device 16 is configured to output the ejection signals to the respective actuator elements of the actuator 15.

<Configuration of Controller>

As depicted in FIG. 3, the controller 7 includes a central processing unit ("CPU") 71, a read only memory ("ROM")

72, a random access memory ("RAM") 73, an interface ("I/F") 74, a raster image processor ("RIP") 75, an image processing IC 76, a conveyance control IC 77, and a recording control IC 78.

The ROM 72 stores therein programs to be executed by the CPU 71 and the RIP 75. The RAM 73 is used as a work area for the CPU 71 and the RIP 75.

The I/F 74 allows for data communication with an external device 9, e.g., a personal computer ("PC"). For example, the I/F 74 may allow for image data reception from the external device 9. The image data may include data written, for example, in page description language (PDL). The RIP 75 is configured to perform a known raster image processing (RIP) for the image data received from the external device 9 to generate RGB data, which is represented by the RGB color system. The RGB data may be bit map data in which red (R), green (G) and blue (B) color values with 256 levels are assigned to each pixel.

Figure 4A:
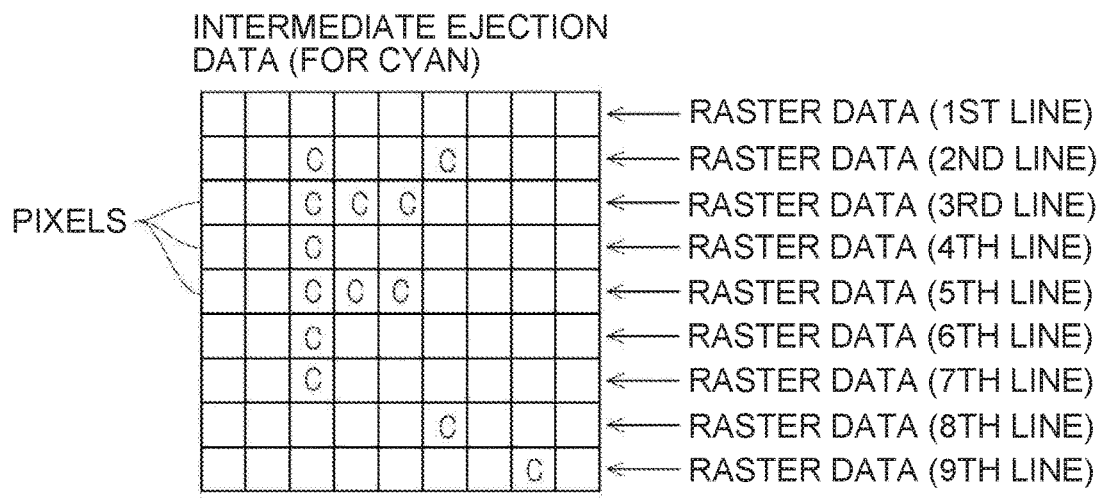
FIG. 4A is a diagram illustrating intermediate ejection data according to one or more aspects of the disclosure.

The image processing IC 76 is configured to generate intermediate ejection data for each ink color based on the RGB data. In one example, the image processing IC 76 first performs color space conversion for the RGB data, to produce CMYK data. The CMYK data may be data in which cyan (C), magenta (M), yellow (Y), and black (K) color values with 256 levels are assigned to each pixel. Cyan, magenta, yellow, and black are colors of inks that are to be ejected from the inkjet head 4. Subsequently, the image processing IC 76 executes, for example, a known error diffusion processing for quantizing the CMYK data, to generate intermediate ejection data with lower level for each ink color, as depicted in FIG. 4A. For example, the CMYK data may be quantized into two levels if the printer 1 is capable of recording an image with two levels, or into four levels if the printer 1 is capable of recording an image with four levels. FIG. 4A illustrates intermediate ejection data for cyan in two levels. In the matrix, the letter C represents a pixel for which cyan ink is to be ejected, and a pixel for which no cyan ink is to be ejected is shown without any letter. FIG. 4A illustrates nine rows or lines of raster data, each including nine pixels.

As can be seen from FIG. 4A, the intermediate ejection data includes a plurality of rows or lines of raster data. The raster data for one line is an array of a plurality of pixels, each pixel corresponding to a respective one of dots to be arranged on the recording sheet 100 in the left-right direction. The dots include such dots that require no ink ejection.

The conveyance control IC 77 is configured to control the conveyance motor 8 to cause the conveyance rollers 5 and 6 to convey the recording sheet 100 in the conveyance direction.

The recording control IC 78 is configured to generate ejection data for each of the four head chips 11, based on the intermediate ejection data for each color generated by the image processing IC 76. The recording control IC 78 is configured to generate ejection data for executing ejection processing to eject four colors of ink from the head chips 11, based on the ejection data. The ejection processing is performed in a state in which the recording sheet 100 facing the head chips 11 is being conveyed, to record an image on the recording sheet 100.

Figure 4B:
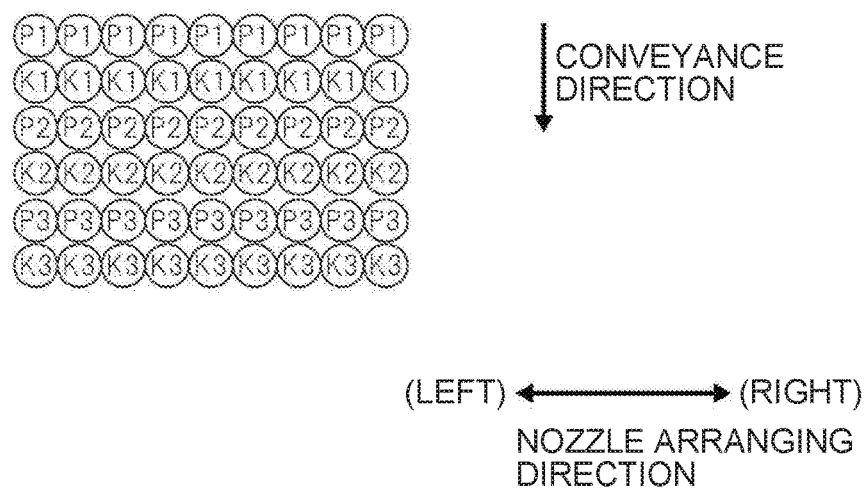
FIG. 4B is a diagram illustrating ink drop deposition onto a recording sheet according to one or more aspects of the disclosure.

For the ejection processing, the controller is configured to generate ejection data for controlling ejection times for the nozzle rows 14 such that each of primary color inks (e.g., yellow, magenta, and cyan inks) is able to be deposited alone or overlapping another primary color ink at a primary color ink landing position. The primary color ink landing position is different from the landing positions of the black ink (as depicted in FIG. 4B). The primary color ink landing position may receive a single or combination of the primary color inks. In one example, a landing or deposition position of ink ejected from at least one of the nozzle rows 14Y, 14M, 14C on the recording sheet 100 may be different, with respect to the conveyance direction, from a landing or deposition position of ink ejected from the nozzle row 14K on the recording sheet 100.

A reason for this is to prevent reduction in saturation of a mixed color, which is formed by mixing any primary colors cyan, yellow, and magenta. Mixture of primary colors creates mixed colors, e.g., secondary colors and tertiary colors, such as red, blue, and green. Black is a lowest brightness color. Accordingly, black may reduce saturation of mixed colors, even with a small amount. To maintain saturation of mixed colors, it may be preferable that black ink may be deposited on a position of the recording sheet 100 different to that of each of the primary color inks, which may be components of a mixed color. When multiple colors are mixed to create a specific color, a color of ink that is deposited first on the sheet 100 is likely to be dominant. If a primary color ink is deposited over black ink on the sheet 100, the primary color ink may turn into a darker color. Black is the lowest color with respect to brightness, as described above, so that the brightness of the primary color ink deposited over black ink may be significantly reduced. This may result in an improper mixed color creation. In other words, black ink deposited on a position of the sheet 100 different from a position of each of the primary color inks may prevent significant reduction in brightness of the primary color inks, leading to proper mixed color creation.

For example, the printer 1 may use pigment ink for black to place an emphasis on text and lines (e.g., for appealing to the eye), and dye ink for other colors (e.g., primary colors) to increase saturation. If a primary color ink is deposited overlapping black ink, saturation of pigment black ink may be reduced, resulting in unappealing text and lines. Accordingly, to emphasize text and lines with black pigment ink, it may be preferable to deposit black ink at a different position on the sheet 100 to that of each of the primary color inks.

For the above reason, the recording control IC 78 generates ejection data for controlling ejection times of the respective nozzle rows 14 to alternate a black ink dot and a primary color ink dot along the conveyance direction of the recording sheet 100. Such controlling is described in detail below with reference to FIG. 4B.

In FIG. 4B, the letter K represents a landing or deposition position of black ink on the recording sheet 100. The letter P represents a landing or deposition position of at least two different primary color inks of yellow, cyan, and magenta. In the illustrative embodiment, inks of multiple primary colors yellow, cyan, and magenta may be deposited on a landing position P. In another example, ink of one primary color may be deposited in a landing position P. The number N following the letter P or K corresponds to the "N"th line of raster data. For example, "K2" represents a landing position of black ink ejected based on a pixel of the second line of raster data.

With respect to landing positions of primary color inks deposited on the recording sheet 100 based on a corresponding or the same line of raster data of ejection data for the respective colors, the recording control IC 78 generates ejection data for controlling the inkjet head 4 such that a landing position of one of the primary color inks aligns in the nozzle arranging direction. In one example, with respect to a corresponding line of raster data in the respective color ejection data, the recording control IC 78 generates ejection data for controlling ejection times of inks from the nozzle rows 14Y, 14M, and 14C such that a first ejection time interval, a second ejection time interval, and a third ejection time interval becomes a first particular time interval. The first ejection time interval is a temporal ink ejection interval between the nozzle rows 14Y and 14M. The second ejection time interval is a temporal ink ejection interval between the nozzle rows 14M and 14C. The third ejection time interval is a temporal ink ejection interval between the nozzle rows 14Y and 14C. The first particular time interval is a temporal interval obtained by dividing a distance in the conveyance direction between two nozzle rows to be used, by a conveying speed of the recording sheet 100. The distance between the two nozzle rows to be used may be, for example, a distance between the nozzle rows 14Y and 14M; a distance between the nozzle rows 14M and 14C; and a distance between the nozzle rows 14Y and 14C. Inks of any two of yellow, cyan and magenta may be deposited at the same or one position to form a secondary color ink dot on the recording sheet 100, or all of three colors may be deposited at the same or one position to form a tertiary color ink dot on the sheet 100.

For example, assuming that ink is ejected from the nozzle rows 14C and 14K, the recording control IC 78 generates ejection data for controlling ejection times of inks from the respective nozzle rows 14C and 14K in the following matter. For example, with respect to the same or corresponding line of respective cyan and black raster data, the recording control IC 78 generates ejection data for controlling ejection times of inks from the nozzle rows 14C and 14K such that a fourth ejection time interval becomes a second particular time interval. The fourth ejection time interval is a temporal ink ejection interval between the nozzle rows 14C and 14K. The second particular time interval is a temporal interval obtained by dividing a distance in the conveyance direction between the nozzle rows 14C and 14K, to which a predetermined distance is added, by a conveying speed of the recording sheet 100. The predetermined distance is a distance corresponding to a shifted amount in the conveyance direction between a black dot and its adjacent dot formed by primary color inks on the recording sheet 100. The predetermined distance is shorter than a distance in the conveyance direction between two dots formed on the recording sheet 100 with a given nozzle 12 based on two consecutive lines of raster data. Accordingly, when inks are ejected from the respective nozzle rows 14Y, 14M, 14C, and 14K based on a corresponding line of the respective raster data, a landing position of black ink does not overlap a landing position of each primary color ink on the recording sheet 100.

(Ejection Processing at Transitional Zones)

Next, ejection processing for ejecting ink from the nozzles 12 in transitional zones is described with reference to FIG. 5. Ejection data for the ejection processing is generated by the recording control IC 78. In FIG. 5, solid circles denote the nozzles 12 to be used in the ejection processing and open circles denote the nozzles 12 to be unused in the ejection processing. Ink ejection from, for example, the head chips 11c1 and 11c2, will be described below. A lower portion in FIG. 5 illustrates, in graphs, usage rates of the nozzles 12 of the respective nozzle rows 14Y, 14M, 14C, and 14K of the head chips 11c1 and 11c2.

Before discussing the ejection processing in further detail, it will be helpful for understanding aspects of the disclosure to briefly discuss print density unevenness caused by, for example, the head chips 11c1 and 11c2. An portion of the recording sheet 100 corresponding to an overlap head zone (e.g., defined by the transitional zones AR1 and AL2) may be referred to as the "portion A" of the recording sheet 100 and other portion of the recording sheet 100 corresponding to other zone of the head chips 11c1 and 11c2 than the overlap head zone(s) may be referred to as a "portion B" of the recording sheet 100. The head chips 11c1 and 11c2 may have nozzles 12 with different ejection characteristics between the head chips 11c1 and 11c2. The head chips 11c1 and 11c2 may also have assembling deviation. These may cause landing position misalignment of inks ejected from the nozzles 12 in the transitional zones AR1 and AL2, resulting in print density unevenness.

To reduce the print density unevenness, nozzles 12 of a nozzle row 14 in the transitional zone AR1 may be switched to nozzles 12 of a corresponding nozzle row 14 in the transitional zone AL2, such that the nozzles 12 of the nozzle rows 14 in the transitional zones AR1 and AL2 are used complementary to each other.

This solution may reduce but not eliminate print density unevenness. As described above, each of at least two inks of yellow, magenta, and cyan may be deposited at the same one position on the recording sheet 100 to form a dot of mixed color, e.g., secondary color and tertiary color. This may cause print density unevenness to be more noticeable in an image formed by the nozzles 12 in the transitions AR1 and AL2 (e.g., in the portion A of the sheet 100), because the print density unevenness caused by the respective color inks forming the mixed color may build up. Accordingly, print density unevenness in an image between the portion A and the portion B of the recording sheet 100 may be noticeable.

Discussing now the ejection processing in detail with reference to FIG. 5, each of the transitional zones AR1 and AL2 is divided into three sub-zones a1, a2, and a3. The sub-zones a1, a2, and a3 correspond to the nozzle rows 14C, 14M, and 14Y, respectively. Each of the sub-zones a1, a2, and a3 is located at a position different from one another in the left-right direction without overlapping one another. A width of each of the sub-zones a1, a2, and a3 in the left-right direction is the same, and each sub-zone a1, a2, and a3 has the same number of the nozzles 12 therein.

In operation, the nozzles 12 of the respective nozzle rows 14C, 14M, and 14Y may be switched from a head chip 11c1 to another head chip 11c2 at a corresponding sub-zones a1, a2, and a3.

In one example, the recording control IC 78 is configured to generate ejection data for executing the ejection processing in which the nozzles 12 of the nozzle row 14C in the sub-zone a1 of the head chip 11c1 and the counterpart of the head chip 11c2 (e.g., the nozzles 12 of the nozzle row 14C in the sub-zone a1 of the head chip 11c2) are used complementary to each other at respective predetermined usage rates. The recording control IC 78 is also configured to generate ejection data for executing the ejection processing in which the nozzles 12 of the nozzle row 14M in the sub-zone a2 of the head chip 11c1 and the counterpart of the head chip 11c2 (e.g., the nozzles 12 of the nozzle row 14M in the sub-zone a2 of the head chip 11c2) are used complementary to each other at respective predetermined usage rates. Similarly, the recording control IC 78 is configured to generate ejection data for executing the ejection processing in which the nozzles 12 of the nozzle row 14Y in the sub-zone a3 of the head chip 11c1 and the counterpart of the head chip 11c2 (e.g., the nozzles 12 of the nozzle row 14Y in the sub-zone a3 of the head chip 11c2) are used complementary to each other at respective predetermined usage rates.

A usage rate indicates a ratio of the nozzles 12 to be used in the head chips 11c1 and 11c2. In other words, the usage rate indicates how many dots (including non-ejection dot) are formed in a predetermined area of the recording sheet 100 by the nozzles 12 of which the head chip 11c1 or 11c2. For example, it is assumed that ten (10) dots are to be formed in an area of the recording sheet 100 based on the ejection data and the usage rate of the head chip 11c1 for that area is, for example, 70%. In this case, seven dots out of ten are to be formed by the nozzles 12 of the head chip 11c1 while the other three dots are to be formed by the nozzles 12 of the head chip 11c2.

As can been seen from the graph in FIG. 5, which shows the usage rates of the nozzle rows 14C of the head chips 11c1 and 11c2, a usage rate of the nozzles 12 of the nozzle row 14C of the head chip 11c1 to the left of the sub-zone a1 is 100%. A usage rate of the nozzles 12 of the nozzle row 14C of the head chip 11c2 to the right of the sub-zone a1 is 100%.

In the sub-zones a1, the usage rates of the nozzle rows 14C change linearly. In one example, the usage rate of the nozzles 12 of the head chip 11c1 gradually decreases from left to right, while the usage rate of the nozzles 12 of the head chip 11c2 gradually increases from left to right. The usage rates of the nozzles 12 of the head chips 11c1 and 11c2 thus gradually change. This gradual change in the usage rates for the nozzle rows 14C between the head chips 11c1 and 11c2 may reduce print density unevenness in an image formed on the recording sheet 100 (e.g., in the portion A) with the nozzles 12 of the nozzle rows 14C in the sub-zones a1, even if there are differences in ejection characteristics or performances between the nozzles 12 of the head chips 11.

The recording control IC 78 is configured to generate ejection data for executing the ejection processing in which the nozzles 12 of the nozzle row 14M at the sub-zone a2 of the head chip 11c1 and the counterpart of the head chip 11c2 are used complementary to each other at respective predetermined usage rates. As can been seen from the graph in FIG. 5, the usage rates of the nozzle rows 14M of the head chips 11c1 and 11c2 change linearly in the sub-zones a2.

The recording control IC 78 is configured to generate ejection data for executing the ejection processing in which the nozzles 12 of the nozzle row 14Y at the sub-zone a3 of the head chip 11c1 and the counterpart of the head chip 11c2 are used complementary to each other at respective predetermined usage rates. As can been seen from the graph in FIG. 5, the usage rates of the nozzle rows 14Y of the head chips 11c1 and 11c2 change linearly in the sub-zones a3.

Thus, the recording control IC 78 generates the ejection data for controlling the use of the nozzles 12 of each of the nozzle rows 14Y, 14M, and 14C to be switched from the head chip 11c1 to the head chip 11c2 at a corresponding sub-zone a1-a3 of the transitional zones AR1 and AL2. This may reduce buildup or accumulation of print density unevenness of yellow, magenta, and cyan inks on the recording sheet 100.

As mentioned above, a landing position of black ink on the recording sheet 100 is different from that of each of other three primary color inks. Accordingly, print density unevenness on the recording sheet 100 caused by black ink may not overlap with print density unevenness caused by the primary color inks. Accordingly, use of the nozzles 12 of the nozzle rows 14K does not necessarily be switched from the head chip 11c1 to the head chip 12c at a zone other than the sub-zones a1, a2, and a3.

A sub-zone a4 overlaps with the sub-zones a1, a2, a3 in the left-right direction. The sub-zone a4 is a zone where use of the nozzles 12 of the nozzle rows 14K may be switched from the head chip 11c1 to the head chip 11c2. The recording control IC 78 is configured to generate ejection data for executing the ejection processing in which the nozzles 12 of the nozzle row 14K in the sub-zone a4 of the head chip 11c1 and the counterpart of the head chip 11c2 (e.g., the nozzles 12 of the nozzle row 14K in the sub-zone a4 of the head chip 11c2) are used complementary to each other at respective predetermined usage rates.

The sub-zone a4 overlaps with the sub-zones a1, a2, and 3. This arrangement may reduce the width of the transitional zone in the left-right direction as compared with a case in which the sub-zone a4 is provided at a position different from the sub-zones a1, a2, and a3. Accordingly, the width of the transitional zone AR1 of the head chip 11c1 or the transitional zone AL2 of the head chip 11c2 in the left-right direction may be reduced. This may reduce the number of the head chips 11 required to constitute one line head that extends a predetermined length in the left-right direction.

As can be seen from the graph of FIG. 5, which shows the usage rates of the nozzle rows 14K, the usage rates of the nozzle rows 14K change linearly in the sub-zones a4. The sub-zone a4 is wider than each of the sub-zones a1, a2, and a3. Accordingly, the slope of the graph indicating changes in the usage rates of the nozzle rows 14K is not as steep as the slopes of the graphs indicating changes in the usage rates of other nozzle rows 14Y, 14M, and 14C. This may reduce print density unevenness of an image formed on the recording sheet 100 (e.g., in the portion A) with the nozzles 12 of the nozzle rows 14K in the transitional zones a4 of the head chips 11c1 and 11c2.

(Controls for Ink Landing/Deposition Sequence)

Each of yellow, cyan, and magenta inks deposited at one same position on the recording sheet 100 may form a secondary or tertiary color dot. The resulting color of the dot may be perceived by the human eye differently depending on landing or deposition sequences of the inks.

For example, it is assumed that yellow and cyan inks are deposited or overlaid at the same position to form a dot of secondary color green. Hue of a dot formed on the recording sheet 100 by the deposition of yellow ink first, and then cyan ink may be different from hue of a dot formed on the recording sheet 100 by the deposition of cyan ink first, and then yellow ink.

Taking the head chips 11c1 and 11c2 as an example, the arrangement of the nozzle rows 14Y, 14M, and 14C in the conveyance direction is different between portions of the head 4 where the transitional zones AR1 and AL2 are provided and are not provided. At a portion of the head 4 where the transitional zones AR1 and AL2 are aligned in the conveyance direction, the nozzles rows 14Y, 14M, and 14C are arranged in the conveyance direction from the upstream side in the conveyance direction, in the order of the nozzle row 14Y (of the head chip 11c1); the nozzle row 14M (of the head chip 11c1); the nozzle row 14C (of the head chip 11c1); the nozzle row 14Y (of the head chip 11c2); the nozzle row 14M (of the head chip 11c2); and the nozzle row 14C (of the head chip 11c2). At a portion of the head 4 where the transitional zones AR1 and AL2 are not provided, the nozzle rows 14Y, 14M, and 14C are arranged in the conveyance direction from the upstream side in this order. This may create differences in the landing/deposition sequences of the primary color inks when a dot of a mixed color is formed by depositing at least two of yellow, cyan, and magenta inks at one same position on the recording sheet 100. Consequently, dots of inks ejected from the nozzles 12, which are within the transitional zones AR1 and AL2 and which are not within the zones AR1 and AL2, may cause hue difference, resulting in a degraded image quality on the recording sheet 100.

With respect to the nozzle rows 14Y, 14M, and 14C, each sub-zone a1-a3 of the head chips 11c1 and 11c2 has a sub-zone corresponding nozzle row (e.g., the nozzle row 14C for the sub-zone a1) and sub-zone noncorresponding nozzle rows (e.g., the nozzle rows 14M and 14Y for the sub-zone a1). The sub-zone corresponding nozzle row corresponds to the respective one of the sub-zones a1-a3. The sub-zone noncorresponding nozzle rows are the nozzle rows within each of the sub-zones a1-a3 other than the sub-zone corresponding nozzle row. The sub-zone a1 of the head chip 11c1 and the sub-zone a1 of the head chip 11c2 define a first overlap sub-zone. Similarly, the sub-zones a2 of the head chips 11c1 and 11c2 define a second overlap sub-zone and the sub-zones a3 of the head chips 11c1 and 11c2 define a third overlap sub-zone. In each overlap sub-zone, the nozzles 12 of sub-zone noncorresponding nozzle rows of either one of the head chips 11c1 and 11c2 are used. One example uses the nozzles 12 of sub-zone noncorresponding nozzle rows, which are not sandwiched between the sub-zone corresponding nozzle rows of the head chips 11c1 and 11c2.

For example, with respect to the sub-zones a1 of the head chips 11c1 and 11c2 (e.g., the first overlap sub-zone), the nozzle rows 14C are the sub-zone corresponding nozzle rows, among the nozzle rows 14Y, 14M, and 14C, whereas the nozzles rows 14Y and 14M are sub-zone noncorresponding nozzle rows. In the sub-zones a1 (e.g., the first overlap sub-zone), the nozzle rows 14Y and 14M of the head chip 11c2 are sandwiched between the nozzle rows 14C of the respective head chips 11c2 and 11c1. In contrast, the nozzle rows 14Y and 14M of the head chip 11c1 are not sandwiched between the nozzle rows 14C of the respective head chips 11c2 and 11c1. Accordingly, with respect to the sub-zones a1 (e.g., the first overlap sub-zone), the nozzles 12 of the nozzle rows 14Y and 14M of the head chip 11c1 are used while the nozzles 12 of the nozzle rows 14Y and 14M of the head chip 11c2 are not.

For example, with respect to the sub-zones a2 of the head chips 11c1 and 11c2 (e.g., the second overlap sub-zone), the nozzle rows 14M are the sub-zone corresponding nozzle rows among the nozzle rows 14Y, 14M, and 14C, whereas the nozzle rows 14Y and 14C are the sub-zone noncorresponding nozzle rows. In the sub-zones a2 (e.g., the second overlap sub-zone), the nozzle row 14Y of the head chip 11c2 and the nozzle row 14C of the head chip 11c1 are sandwiched between the nozzle rows 14M of the respective head chips 11c2 and 11c1. In contrast, the nozzle row 14Y of the head chip 11c1 and the nozzle row 14C of the head chip 11c2 are not sandwiched between the nozzle rows 14M of the respective head chips 11c2 and 11c1. Accordingly, with respect to the sub-zones a2 (e.g., the second overlap sub-zone), the nozzles 12 of the nozzle row 14Y of the head chip 11c1 and the nozzles 12 of the nozzle row 14C of the head chip 11c2 are used while the nozzles 12 of the nozzle row 14C of the head chip 11c1 and the nozzles 12 of the nozzle row 14Y of the head chip 11c2 are not.

For example, with respect to the sub-zones a3 of the head chips 11c1 and 11c2 (e.g., the third overlap sub-zone), the nozzle rows 14Y are the sub-zone corresponding nozzle rows among the nozzle rows 14Y, 14M, and 14C, whereas the nozzle rows 14M and 14C are the sub-zone noncorresponding nozzle rows. In the sub-zones a3 (e.g., the third overlap sub-zone), the nozzle rows 14M and 14C of the head chip 11c1 are sandwiched between the nozzle rows 14Y of the respective head chips 11c2 and 11c11. In contrast, the nozzle rows 14M and 14C of the head chip 11c2 are not sandwiched between the nozzle rows 14Y of the respective head chips 11c2 and 11c1. Accordingly, with respect to the sub-zones a3 (e.g., the third overlap sub-zone), the nozzles 12 of the nozzle rows 14M and 14C of the head chip 11c2 are used while the nozzles 12 of the nozzle rows 14M and 14C of the head chip 11c1 are not.

In the sub-zones a1-a3 of the head chips 11c1 and 11c2 (e.g. in each of the first, second and third overlap sub-zones), the ink landing/deposition sequence of the primary colors is first yellow, then magenta, and lastly cyan. In other words, the ink landing/deposition sequence of the primary colors in the transitional zones AR1 and AL2 is same as the ink deposition sequence of the primary colors in other zone of the head chips 11c1 and 1k1c2 than the transitional zones AR1 and AL2. This may prevent or reduce changes or difference in hue between the portion A and the portion B of the recording sheet 100.

(Ejection Data Generating Processing)

Next, ejection data generating processing for the nozzles 12 in the transitional zones AR1 and AL2 of the head chips 11c1 and 11c2, respectively, is described with reference to FIGS. 6-8. FIG. 8 schematically illustrates only the nozzle rows 14C of the head chips 11c1 and 11c2. Each of the transitional zones AR1 and AL2 of the head chips 11c1 and 11c2 has, for example, sixty (60) nozzles 12, in each nozzle row 14.

The recording control IC 78 includes a memory 78a (in FIG. 3) that stores a usage rate table as depicted in FIG. 6. This table shows usage rates of the nozzles 12 in the respective transitional zones (e.g., sub-zones) of the head chips 11 (e.g., the head chips 11c1 and 11c2) according to the nozzles rows 14. In ejection data generating processing, ejection data for each of the head chips 11c1 and 11c2 (e.g., two pieces of ejection data) may be generated with reference to the usage rate table. For the purpose of description, the usage rate table in FIG. 6 shows usage rates of the nozzles 12 in non-transitional zones of the head chips 11c1 and 11c2. The non-transitional zones are portions of the nozzle zones 13 of the respective head chips 11c1 and 11c2 other than the transitional zones AR1 and AR2.

As depicted in FIG. 8, the sub-zone a1 is divided into, for example, five sections, in the left-right direction. Although not illustrated, each of the sub-zones a2 and a3 is also divided into, for example, five sections, in the left-right direction. Each section of the sub-zones a1-a3 has the same number of the nozzles 12, e.g., four nozzles. The sub-zone a4 is divided into, for example, fifteen (15) sections, in the left-right direction. The five sections from left out of the fifteen sections overlap or correspond to the five sections of the sub-zone a1 in the left-right direction. The five sections from right overlap or correspond to the five sections of the sub-zone a3 in the left-right direction. The remaining five sections, which are centrally located in the left-right direction, overlap or correspond to the five sections of the sub-zone a2. Each of the fifteen (15) sections has the same width in the left-right direction, and has the same number of the nozzles 12, e.g., four.

The usage rate table specifies usage rates of the nozzles 12 for each of the sections of the sub-zones a1-a4 according to the nozzle rows 14, such that the usage rates linearly change in each of the sub-zones a1-a4. For example, with respect to the nozzle row 14C of the head chip 11c1, the usage rates of the five sections of the sub-zone a1 are specified as 100%, 75%, 50%, 25%, and 0%, from the leftmost sections. In contrast, with respect to the nozzle row 14C of the head chip 11c2, the usage rates of the five sections of the sub-zone a1 are specified as 0%, 25%, 50%, 75%, and 100%, from the leftmost section. Accordingly, with respect to sub-zone corresponding nozzle rows corresponding to sub-zones of the head chips 11c1 and 11c2, usage rates of nozzles gradually change between sections of the sub-zones.

In the sub-zones a1-a3 (e.g., in each of the first to third overlap sub-zones), the usage rate of each of the sub-zone noncorresponding nozzle rows, which are not sandwiched between the sub-zone corresponding nozzle rows of the head chips 11c1 and 11c2, is 100% in each section. In the sub-zones a1-a3 (e.g., in each of the first to third overlap sub-zones), the usage rate of each of the sub-zone noncorresponding nozzle rows, which are sandwiched between the sub-zone corresponding nozzle rows of the head chips 11c1 and 11c2, is 0% in each section. For example, the usage rates of the nozzle rows 14Y and 14M at the five sections of the sub-zone a1 of the head chip 11c1 are specified as 100%, whereas the usage rates of the nozzle rows 14Y and 14M at the five sections of the sub-zone a1 of the head chip 11c2 are specified as 0%.

Next, flow of ejection data generating processing to be executed by the recording control IC 78 is described. The ejection data generating processing is now described in conjunction with the nozzles 12 of the nozzle rows 14C in the sub-zones a1 (e.g., in the first overlap sub-zone). Ejection data generating processing for the nozzles 12 of other nozzle rows 14Y and 14M in the sub-zones a1 is basically the same as the ejection data generating processing the nozzles 12 of the nozzle rows 14C in the sub-zones a1. Further, ejection data generating processing for the nozzle rows 14C, 14Y and 14M of other sub-zones a2 and a3, as well as for the nozzle rows 14K in the sub-zones a4, is basically the same as the ejection data generating processing for the nozzles 12 of the nozzle rows 14C in the sub-zones a1.

Figure 7:
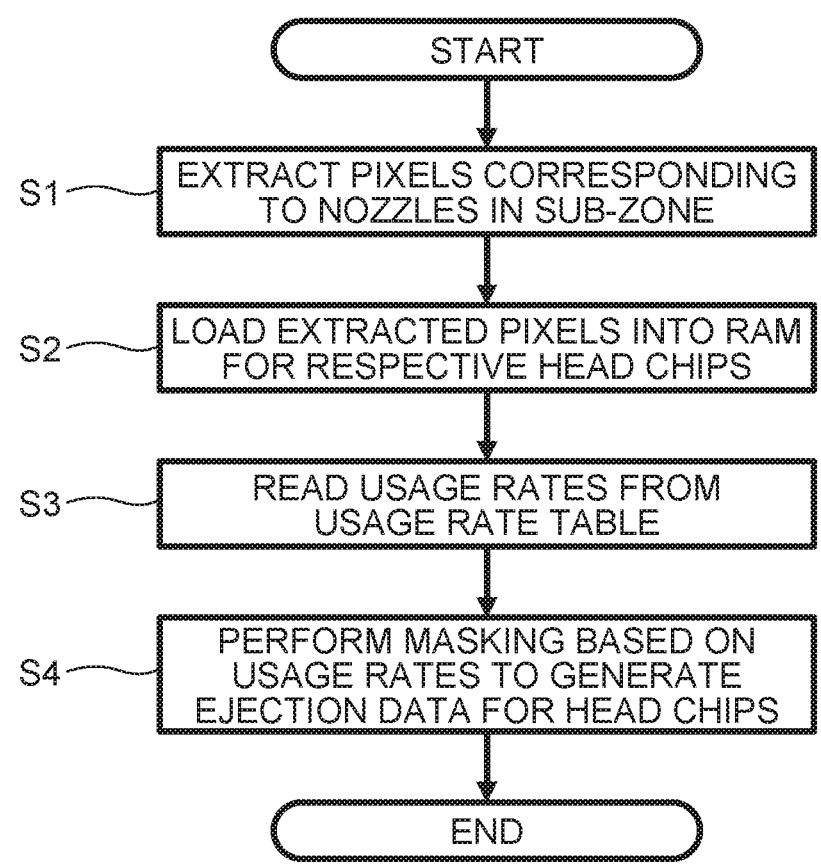
FIG. 7 is a flowchart of ejection data generating processing according to one or more aspects of the disclosure.
Figure 8:
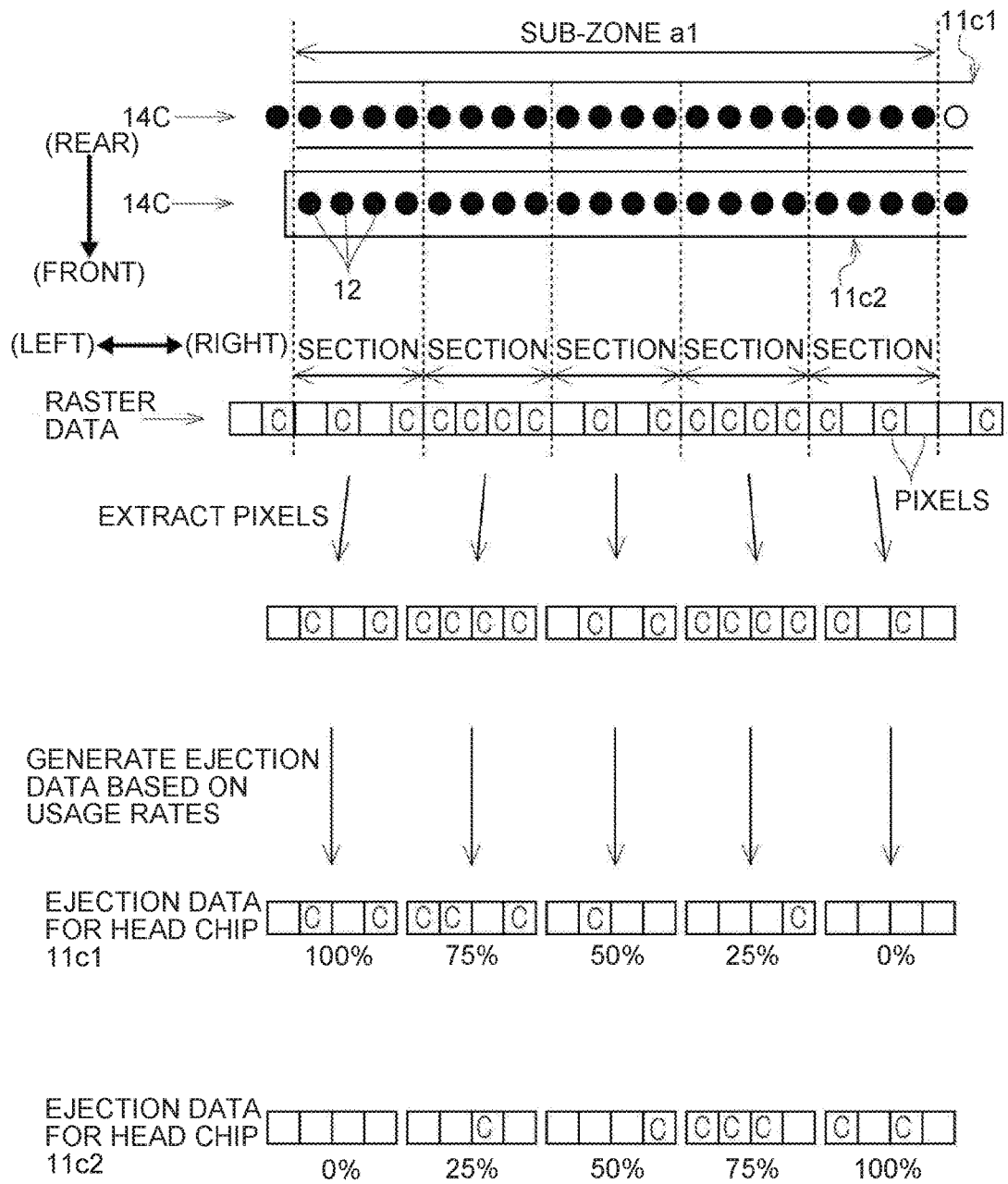
FIG. 8 is a diagram illustrating the ejection data generating processing according to one or more aspects of the disclosure.

As depicted in FIG. 7, for each of the head chips 11c1 and 11c2, the recording control IC 78 extracts twenty (20) pixels from one line of raster data of ejection data for cyan ink (S1). The twenty (20) pixels correspond to the twenty (20) nozzles 12 provided in the sub-zone a1. As can be seen from FIG. 8, the twenty pixels extracted in correspondence with the twenty nozzles 12 in the sub-zone a1 include pixels that require ink ejection (e.g., pixels represented by the letter "C"s in boxes in FIG. 8), as ell as pixels that do not require ink ejection (e.g., pixels with no letter in boxes in FIG. 8).

Subsequently, the recording control IC 78 loads the twenty pixels extracted at S1 into the RAM 73, in correspondence with the twenty nozzles 12 of the nozzle row 14C in the sub-zone a1 of the head chip 11c1 (S2). Similarly, the recording control IC 78 loads the twenty pixels extracted at S1 into the RAM 73, in correspondence with the twenty nozzles 12 of the nozzle row 14C in the sub-zone a1 of the head chip 11c2 (S2). Accordingly, the number of pixels corresponding to the sub-zones a1 is forty (40) in total. Subsequently, the recording control IC 78 reads the usage rates specified for the sections of the sub-zones a1 for the nozzle rows 14C, from the usage rate table stored in the memory 78a (S3).

Subsequently, the recording control IC 78 performs masking, in accordance with the usage rates read at S3, on the respective sets of twenty pixels (40 pixels in total) loaded at S2 into the RAM 73 (S4). In one example, the recording control IC 78 performs masking on the twenty pixels corresponding to the nozzles 12 of the nozzle row 14C in the sub-zone a1 of the head chip 11c1 and another twenty pixels corresponding to the nozzles 12 of the nozzle row 14C in the sub-zone a1 of the head chip 11c2, based on usage rates specified for sections of the respective sub-zones a1.

At S4, the recording control IC 78 generates a mask pattern for each of the head chips 11c1 and 11c2, based on the usage rates specified for the sections of the sub-zones a1. The mask patters for head chips 11c1 and 11c2 are complementary to each other, with respect to a particular section of the head chip 11c1 and its corresponding section of the head chip 11c2. The recording control IC 78 ANDs data constituted by the twenty pixels for the head chip 11c1, which are loaded into the RAM 73 at S2, with the mask pattern for the head chip 11c1. The resulting data is the ejection data for the nozzles 12 of the nozzle row 14C in the sub-zone a1 of the head chip 11c1. Similarly, the recording control IC 78 ANDs data constituted by the twenty pixels for the head chip 11c2, which are loaded into the RAM 73 at S2, with the mask pattern for the head chip 11c2. The resulting data is the ejection data for the nozzles 12 of the nozzle row 14C in the sub-zone a1 of the head chip 11c2.

The recording control IC 78 outputs the ejection data for the head chips 11c1 and 11c2 to the driving device 16. This enables the nozzles 12 of the nozzle rows 14C in the sub-zones a1 of the respective head chips 11c1 and 11c2 to be used complementary. To prevent particular nozzles 12 in the sub-zones a1 from being unused for a long period of time, it may be preferable to use another mask pattern for every predetermined number of lines of raster data while the usage rates for the respective sections are maintained.

Two pieces of the ejection data, one for twenty pixels corresponding to the nozzles 12 of the head chip 11c1 and the other for another twenty pixels corresponding to the nozzles 12 of the head chip 11c2, may be generated without mask patterns. For example, based on unused periods of the nozzles 12 in the respective sub-zones a1 of the head chips 11c1 and 11c2, the recording control IC 78 may generate a piece of ejection data for the twenty nozzles 12 of each of the head chips 11c1 and 11c2, in accordance with the usage rates, such that the nozzles 12 which have longer unused periods may be used preferentially.

Figure 9:
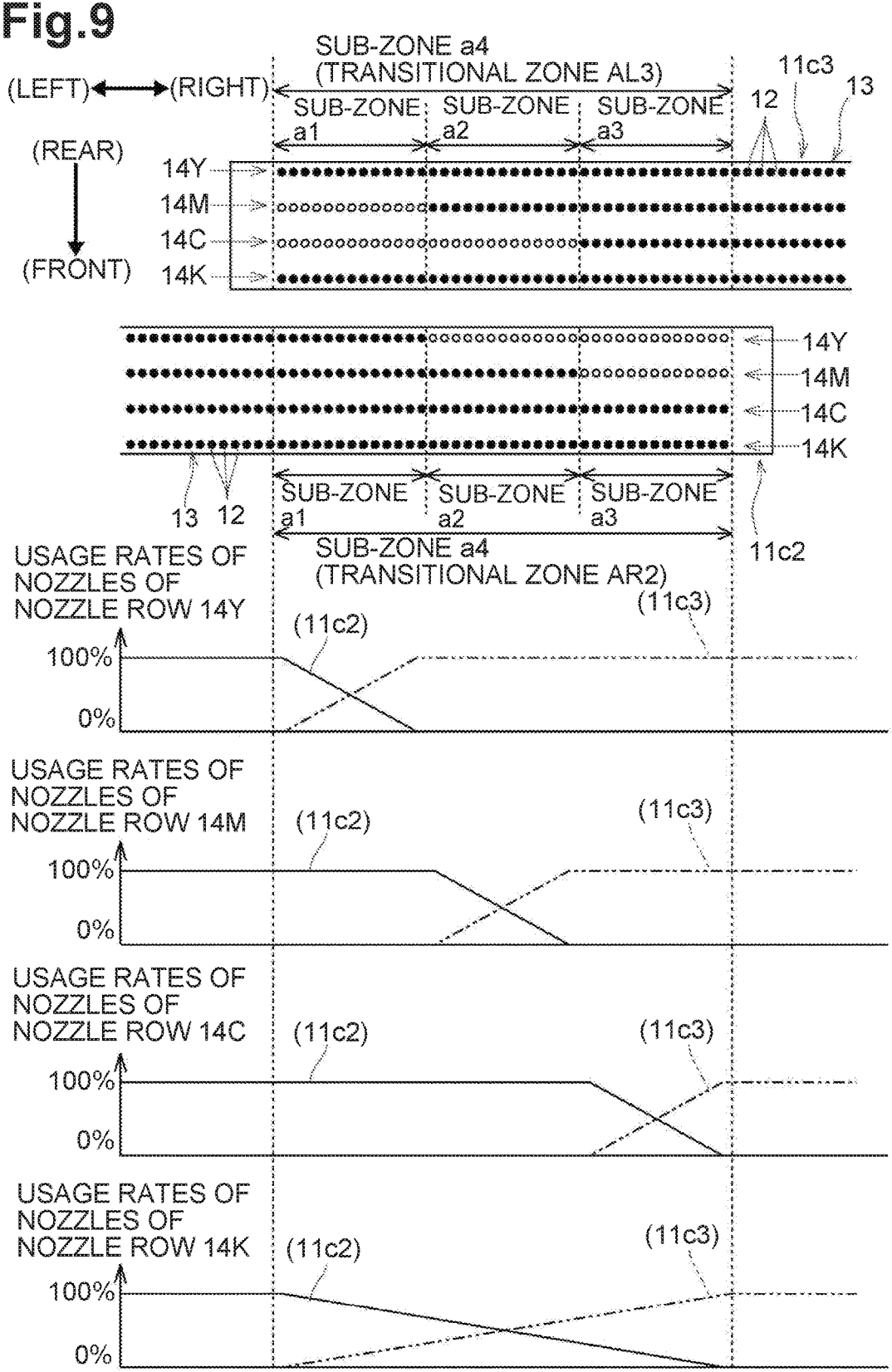
FIG. 9 illustrates fluid ejection processing at a transition between two head chips according to one or more aspects of the disclosure.

The illustrative embodiment is described in conjunction with an example in which ink is ejected from the head chips 11c1 and 11c2. Aspects of the disclosure may be applied to other examples in which ink is ejected from the head chips 11c2 and 11c3, as well as from the head chips 11c3 and 11c4. Such examples may also reduce print density unevenness of an image formed on the recording sheet 100. For example, an example where ink is ejected from the head chips 11c2 and 11c3 will be briefly described referring to FIG. 9. A significant difference from the above-described illustrative embodiment is a reversed arranging direction of the sub-zones a1-a3 in the left-right direction. In this example, the sub-zones a1-a3 are arranged in this order from right to left. Except the arranging direction of the sub-zones a1-a3, ink may be ejected from the head chips 11c2 and 11c3 in a similar manner to the example in which ink is ejected from the head chips 11c1 and 11c2. Ink may be ejected from the head chips 11c3 and 11c4 basically in the same manner to the example in which ink is ejected from the head chips 11c1 and 11c2.

As described above, the sub-zones a1-a3 are disposed at different positions from one another in the left-right direction. The use of the nozzles 12 of the nozzle rows 14C, 14Y, and 14M is switched from the head chip 11c1 to the head chip 11c2 at the corresponding the sub-zones a1-a3. This may reduce degradation of quality of an image, which is caused by ink deposited on the recording sheet 100 in differing orders from the respective nozzle rows 14C, 14Y, and 14M. The sub-zone a4 overlaps with the sub-zones a1-a3 in the left-right direction. This arrangement may reduce a width in the left-right direction of, for example, each of the transitional zones AR1 and AL2 of the head chips 11c1 and the head chip 11c2, respectively. Further, the recording control IC 78 generates ejection data for controlling ink ejection times such that color ink from the respective nozzle rows 14C, 14Y, and 14M may be deposited onto the recording sheet 100 at a location different from black ink from the nozzle row 14K in the conveying direction. This may reduce degradation of a quality of an image recorded on the recording sheet 100 even if the sub-zone a4 overlaps with the sub-zones a1-a3 in the left-right direction.

The sub-zone a4 overlaps with all of the three sub-zones a1-a3 in the left-right direction. This may allow the sub-zone a4 to have a wider width in the left-right direction. Consequently, occurrence of print density unevenness caused by ink ejected, for example, from the nozzle rows 14K of the head chips 11c1 and 11c2, on the recording sheet 100 may be reduced.

With the ejection data generation by the recording control IC 78 as described above, primary color inks may be ejected in the same sequence from the nozzles 12 in the transitional zones AR1 and AL2 of the head chips 11c1 and 11c2 (e.g., the overlap head zone) and the nozzles 12 in other zone of the head chips 11c1 and 11c2 than the transitional zones AR1 and AL2. This may reduce difference in resulting hue of an image on the recording sheet 100 between the portion A and the portion B.

As described above, each of the sub-zones a1-a4 includes a plurality of sections arranged along the left-right direction. With respect to usage rates of sub-zone corresponding nozzle rows corresponding to sub-zones of, for example, the head chips 11c1 and 11c2, the recording control IC 78 generates two pieces of ejection data in which the usage rates are gradually changed between the sections. Accordingly, print density unevenness of an image on the recording sheet 100 may be less noticeable even if there are differences in ejection characteristics or performances in the nozzles 12 of the head chips 11c1 and 11c2.

In the above-described description, the printer 1 is an example of a fluid ejection apparatus. The inkjet head 4 is an example of a fluid ejection head. The left-right direction is an example of a nozzle arranging direction. The conveyance direction is an example of a relative moving direction. Any two of the nozzle rows 14Y, 14M, and 14C are examples of a first nozzle row and a second nozzle row. The nozzle row 14K is an example of a third nozzle row. Any two of the three sub-zones a1-a3 are examples of a first sub-zone and a second sub-zone. The sub-zone a4 is an example of a third sub-zone.

Various changes, arrangements and modifications may be applied to the above-described illustrative embodiment. Like reference numerals may be used for like corresponding components and a detailed description thereof with respect to the modifications may be omitted herein.

In the illustrative embodiment, such a control is executed that the ink landing/deposition sequence of primary colors from the nozzles 12 of the transitional zones AR1 and AL2 of the head chips 11c1 and 11c2, which are arranged in staggered adjacency, is the same as the ink landing/deposition sequence of primary colors from the nozzles 12 of other zones of the head chips 11c1 and 11c2 than the transitional zones AR1 and AL2. This configuration results in the sub-zones a1-a3 of either or both of the transitional zones AR1 and AL2 of the head chips 11c1 and 11c2 having unused nozzles which will not be used for the ejection processing (e.g., the nozzles 12 represented by open circles in FIG. 5). No ink is ejected from nozzles to be unused, so that ink in the unused nozzles is dried and may become dense or concentrated. The head chip 11 typically includes common passages, each corresponding to a respective color of ink. The common passage is shared by the plurality of nozzles 12. The denser or concentrated ink in the unused nozzles may reach the nozzles to be used for ink ejection (e.g., the nozzles 12 represented by solid circles in FIG. 5), via the common passages. In this case, the denser ink is to be ejected from the nozzles to be used for ink ejection, leading to deterioration of the quality of an image on the recording sheet 100. Further, the denser ink whose viscosity has increased may clog the nozzles to be used for ink ejection. One solution to this problem is to perform a maintenance operation to forcibly discharge ink from the all nozzles at a regular interval. However, such maintenance may lead to increase in waste ink because ink is forcibly discharged not only from the unused nozzles, but also from the nozzles to be used, which may be greater in number than the unused nozzles. The recording control IC 78 according to the modification is configured to generate ejection data for controlling the inkjet head 4 such that unused nozzles are reduced as much as possible. The modification is described further below.

The memory 78a stores therein a usage rate table, as depicted in FIG. 10. The usage rate 100% in the usage rate table in FIG. 6 is modified to 98% in the usage rate table in FIG. 10, and the usage rate 0% in the usage rate table in FIG. 6 is modified to 2% in the usage rate table in FIG. 10.

As can be seen from the usage rate table in FIG. 10, in the sub-zones a1-a3, the head chips 11c1 and 11c2 may eject ink from the nozzles of the sub-zone noncorresponding nozzle rows as well. For example, in the sub-zones a1, the head chips 11c1 and 11c2 eject ink from the sub-zone corresponding nozzle rows of the nozzle rows 14C, as well as from the sub-zone noncorresponding nozzle rows of the nozzle rows 14Y and 14M. Ink ejection from the sub-zone noncorresponding nozzle rows of the head chips 11c1 and 11c2 is not intended to switch the use of nozzle rows 14 between the head chips 11c1 and 11c2 (e.g., from the head chip 11c1 to the head chip 11c2). Accordingly, such ink ejection may have little effect in reducing print density unevenness that may be caused by ink ejection from the nozzles 12 in either the transitional zone AR1 of the head chip 11c1 or the transitional zone AL2 in the head chip 11c2.

As described above, varying deposition sequence of primary color inks from the transitional zones AR1 and AL2 of the head chips 11c1 and 11c2 and other zones of the head chips 11c1 and 11c2 than the transitional zones AR1 and AL2, may cause differences in resulting hues of an image recorded on the recording sheet 100 (e.g., in the portion A and the portion B). This may result in a deterioration of an image quality. In this modification, in the sub-zones a1-a3 (e.g., the first to third overlap sub-zones), usage rates of the nozzles 12 of the sub-zone noncorresponding nozzle rows sandwiched between the sub-zone corresponding nozzle rows is specified as 10% or less, e.g. 2%, with respect to the total number of nozzles 12 to be used in the sub-zone noncorresponding nozzle rows of the head chips 11c1 and 11c2. For example, in the sub-zones a1 (e.g., the first overlap sub-zone), usage rates of the nozzle rows 14Y and 14M of the head chip 11c2, which are sandwiched between the nozzle rows 14C of the head chips 11c1 and 11c2, is 2%, which is less than 10%. With this configuration, the deposition sequences of the primary color inks from the nozzles 12 in the transitional zones AR1 and AL2 (e.g., overlap head zone), may be almost the same (e.g., at a greater rate) as the deposition sequences of the primary color inks from the nozzles 12 in other zones of the head chips 11c1 and 11c2 than the transitional zones AR1 and AL2. This may reduce hue difference in an image on the recording sheet 100 (e.g., between the portion A and the portion B).

The recording control IC 78 according to the modification is configured to generate ejection data for each of the head chips 11c1 and 11c2, to prevent particular nozzles 12 of the nozzle rows 14Y, 14M and 14C in the respective sub-zones a1-a3 from being unused for a long period of time. For example, as described above, the recording control IC 78 may change mask patterns to be used in the ejection data generating processing, for every predetermined number of lines of raster data. Alternatively, the recording control IC 78 may be configured to generate, based on raster data, ejection data for each of the head chips 11c1 and 11c2 such that the nozzles 12, which have longer unused periods, may be used preferentially. This may prevent or reduce ink in the nozzles 12 in the transitional zones AR1 and AL2 of the head chips 11c1 and 11c2 from becoming viscous. Accordingly, ink to be used during maintenance operation may be reduced.

Other modifications are described below.

The sub-zone a4 is provided overlapping with all of the three sub-zones a1-a3 in the left-right direction (e.g., to fully cover the three sub-zones a1-a3 in the left-right direction). In another example, the sub-zone a4 may be provided overlapping with at least one of the sub-zones a1-a3 in the left-right direction, or partially overlapping with the sub-zones a1-a3 in the left-right direction.

The third nozzle row, e.g., the nozzle row 14K, is configured to eject black ink in the illustrative embodiment. In another example, the third nozzle row may be configured to eject different color ink. Each of the first nozzle row and the second nozzle row, e.g., the nozzle rows 14Y, 14M, and 14C, are configured to eject one of different color inks, e.g., yellow, cyan, and magenta inks, in the illustrative embodiment. In another example, each of the first nozzle row and the second nozzle row may be configured to eject another color ink.

As described above, the head chip 11 includes the four nozzle rows 14C, 14Y, 14M, and 14K, each configured to eject one of different color inks. However, the head chip 11 may not necessarily include four nozzle rows 14, but may include at least three nozzle rows, each configured to one of different color inks.

In the illustrative embodiment, the recording control IC 78 is configured to generate ejection data for controlling ejection times for the nozzle rows 14C, 14Y, 14M, and 14K such that each of color inks of yellow, cyan, and the magenta is deposited at a position different to that of black ink in the conveyance direction. In another example, the image processing IC 76 may be configured to generate intermediate ejection data corresponding to a respective color, such that each of color inks of yellow, cyan, and magenta may be deposited at a position different to that of black ink in the conveyance direction. The image processing IC 76 may determine based on CMYK data whether an object constituting an image to be recorded on the recording sheet 100 includes only monochrome text. Based on the determination that data of the object includes only monochrome text, the object may be formed in black ink. In addition, the image processing IC 76 may be configured to generate intermediate ejection data for a respective color such that a black portion of an object other than monochrome text is formed by mixing primary color inks into a tertiary color ink (so-called "composite black").

In the illustrative embodiment, each of the sub-zones a1-a4 is divided into sections. However, each zone a1-a4 does not necessarily be divided into sections. In other words, the usage rates of the nozzles 12 in each of the sub-zones a1-a4 does not necessarily change linearly but may be constant.

As long as the arranging direction of the nozzles 12 of the nozzle rows 14C, 14Y, 14M, and 14K crosses the conveyance direction, the arranging direction of the nozzles 12 may not be necessarily perpendicular or orthogonal to the conveyance direction.

In the above-described illustrative embodiment, the printer 1 is of a line type in which image recording is performed with the inkjet head 4 fixed. In another example, a printer may be of a serial type in which image recording is performed with a print head scanning or moving in a direction crossing the conveyance direction of the recording sheet 100. In this case, the direction crossing the conveyance direction may be the relative moving direction.

What is claimed is:

1. A fluid ejection apparatus, comprising:
   a nozzle row A comprising nozzles A arranged along the first direction from a first end nozzle of the nozzle row A in a first direction towards a second end nozzle of the nozzle row A in the first direction;
   a nozzle row B comprising nozzles B arranged along the first direction, each of the nozzles B is aligned with a different one of the nozzles A in a second direction orthogonal to the first direction, respectively;
   a nozzle row C comprising nozzles C arranged along the first direction, each of the nozzles C is aligned with a different one of the nozzles A in the second direction, respectively;
   a nozzle row D comprising nozzles D arranged along the first direction from a third end nozzle of the nozzle row D in the first direction towards a fourth end nozzle of the nozzle row D in the first direction;
   a nozzle row E comprising nozzles E arranged along the first direction, each of the nozzles E is aligned with a different one of the nozzles D in the second direction, respectively; and
   a nozzle row F comprising nozzles F arranged along the first direction, each of the nozzles F is aligned with a different one of the nozzles D in the second direction, respectively,
   a controller configured to control ejections of fluid from the nozzles A, the nozzles B, the nozzles C, the nozzles D, the nozzles E and the nozzles F,
   wherein the nozzle row B is positioned between the nozzle row A and the nozzle row D in the second direction,
   wherein the nozzle row D is positioned between the nozzle row B and the nozzle row E in the second direction,
   wherein the nozzles A of the nozzle row A are arranged into a nozzle group A1 and a nozzle group A2,
   wherein the nozzle group A1 comprises some of the nozzles A,
   wherein the nozzle group A2 comprises others of the nozzles A,
   wherein the nozzle group A1 is positioned between the nozzle group A2 and the center of the nozzle row A in the first direction,
   wherein the nozzles B of the nozzle row B are arranged into a nozzle group B1,
   wherein the nozzle group B1 comprises some of the nozzles B, wherein the nozzle group A1 and the nozzle group B1 are aligned along the second direction, wherein the nozzles C of the nozzle row C are arranged into a nozzle group C, wherein the nozzle group C comprises some of the nozzles C, wherein the nozzle group A1 and a portion of the nozzle group C are aligned along the second direction, wherein the nozzles D of the nozzle row D are arranged into a nozzle group D2, wherein the nozzle group D2 of the nozzle row D comprises some of the nozzles D, wherein the nozzle group A2 and the nozzle group D2 are aligned along the second direction, wherein the nozzles E of the nozzle row E are arranged into a nozzle group E1 and a nozzle group E2, wherein the nozzle group E1 comprises some of the nozzles E, wherein the nozzle group E2 comprises others of the nozzles E, wherein the nozzle group A1 and the nozzle group E1 are aligned along the second direction, wherein the nozzle group A2 and the nozzle group E2 are aligned along the second direction, wherein the nozzles F of the nozzle row F are arranged into a nozzle group F, wherein the nozzle group F comprises some of the nozzles F, wherein the nozzle group A1 and a portion of the nozzle group F are aligned along the second direction, wherein the nozzle group C and the nozzle group F are aligned along the second direction, wherein the controller is configured to control:
  the nozzle group A1 to eject fluid at an average usage rate A1 that is an average of usage rates of the some of nozzles A comprising the nozzle group A1;
  the nozzle group A2 to eject fluid at an average usage rate A2 that is an average of usage rates of the others of nozzles A comprising the nozzle group A2;
  the nozzle group B1 to eject fluid at an average usage rate B1 that is an average of usage rates of the some of nozzles B comprising the nozzle group B1;
  the nozzle group C to eject fluid at an average usage rate C that is an average of usage rates of the some of nozzles C comprising the nozzle group C;
  the nozzle group D2 to eject fluid at an average usage rate D2 that is an average of usage rates of the some of nozzles D comprising the nozzle group D2;
  the nozzle group E1 to eject fluid at an average usage rate E1 that is an average of usage rates of the some of nozzles E comprising the nozzle group E1;
  the nozzle group E2 to eject fluid at an average usage rate E2 that is an average of usage rates of the others of nozzles E comprising the nozzle group E2; and
  the nozzle group F to eject fluid at an average usage rate F that is an average of usage rates of the some of the nozzles F comprising the nozzle group F, wherein the average usage rate A2 is smaller than the average usage rate A1, wherein the average usage rate B1 is smaller than the average usage rate A1, wherein the average usage rate C is smaller than the average usage rate A1, wherein the average usage rate D2 is smaller than the average usage rate E2, wherein the average usage rate E1 is smaller than the average usage rate E2, and wherein the average usage rate F is smaller than the average usage rate E2.

2. The fluid ejection apparatus according to claim 1,
wherein the nozzle row C is positioned between the nozzle row B and the nozzle row D, and
wherein the nozzle row D and the nozzle row E are positioned between the nozzle row C and the nozzle row F.

3. The fluid ejection apparatus according to claim 1,
wherein the nozzle group A2 and an another portion of the nozzle group C are aligned along the second direction.

4. The fluid ejection apparatus according to claim 1,
wherein the controller is configured to:
  control the nozzle row A and the nozzle row D to form a first dot line corresponding to a particular line of an ejection data,
  control the nozzle row B and the nozzle row E to form a second dot line corresponding to the particular line of the ejection data, and
  control the nozzle row C and the nozzle row F to form a third dot line corresponding to the particular line of the ejection date, and
wherein a position of the third dot line on a recording medium in the second direction is different from each one of a position of the first dot line on the recording medium in the second direction and a position of the second dot line on the recording medium in the second direction.

5. The fluid ejection apparatus according to claim 1,
wherein the nozzle row A and the nozzle row D are configured to eject a fluid of a first primary color,
wherein the nozzle row B and the nozzle row E are configured to eject a fluid of a second primary color, and
wherein the nozzle row C and the nozzle row F are configured to eject a fluid of a black color.

6. The fluid ejection apparatus according to claim 1, wherein the average usage rate A1 is 100%.

7. The fluid ejection apparatus according to claim 6, wherein the average usage rate E2 is 100%.

8. The fluid ejection apparatus according to claim 1,
wherein the nozzles B of the nozzle row B are arranged into a nozzle group B2,
wherein the nozzle group B2 comprises others of the nozzles B,
wherein the nozzle group B1 is positioned between the nozzle group B2 and the center of the nozzle row B along the first direction,
wherein the nozzle group A2 and the nozzle group B2 are aligned along the second direction,
wherein the nozzles D of the nozzle row D are arranged into a nozzle group D1,
wherein the nozzle group D1 comprises others of the nozzles D,
wherein the nozzle group D2 is positioned between the nozzle group D1 and a center of the nozzle row D along the first direction,
wherein the nozzle group A2 and the nozzle group D2 are aligned along the second direction, and
wherein the controller is configured to control:
  the nozzle group B2 to eject fluid at an average usage rate B2 that is an average of usage rates of the others of nozzles B comprising the nozzle group B2, and
  the nozzle group D1 to eject fluid at an average usage rate D1 that is an average of usage rates of the others of the nozzles D comprising the nozzle group B2.

9. The fluid ejection apparatus according to claim 8, wherein the average usage rate B2 is less than or equal to 10%.

10. The fluid ejection apparatus according to claim 8, wherein the average usage rate D1 is less than or equal to 10%.

11. The fluid ejection apparatus according to claim 1,
wherein the usage rates of the others of nozzles A comprising the nozzle group A2 linearly decrease between the others of the nozzles A in the first direction, and
wherein the usage rates of the some of nozzles D comprising the nozzle group D2 linearly increase between the some of the nozzles D in the first direction.

12. A fluid ejection apparatus, comprising:
a nozzle row A comprising nozzles A arranged along the first direction from a first end nozzle of the nozzle row A in a first direction towards a second end nozzle of the nozzle row A in the first direction;
a nozzle row B comprising nozzles B arranged along the first direction, each of the nozzles B is aligned with a different one of the nozzles A in a second direction orthogonal to the first direction, respectively;
a nozzle row C comprising nozzles C arranged along the first direction, each of the nozzles C is aligned with a different one of the nozzles A in the second direction, respectively;
a nozzle row D comprising nozzles D arranged along the first direction from a third end nozzle of the nozzle row D in the first direction towards a fourth end nozzle of the nozzle row D in the first direction;
a nozzle row E comprising nozzles E arranged along the first direction, each of the nozzles E is aligned with a different one of the nozzles D in the second direction, respectively; and
a nozzle row F comprising nozzles F arranged along the first direction, each of the nozzles F is aligned with a different one of the nozzles D in the second direction, respectively,
a controller configured to control ejections of fluid from the nozzles A, the nozzles B, the nozzles C, the nozzles D, the nozzles E and the nozzles F,
wherein the nozzle row B is positioned between the nozzle row A and the nozzle row D in the second direction,
wherein the nozzle row D is positioned between the nozzle row B and the nozzle row E in the second direction,
wherein the nozzles A of the nozzle row A are arranged into a nozzle group A1 and a nozzle group A2,
wherein the nozzle group A1 comprises some of the nozzles A,
wherein the nozzle group A2 comprises others of the nozzles A,
wherein the nozzle group A1 is positioned between the nozzle group A2 and the center of the nozzle row A in the first direction,
wherein the nozzles B of the nozzle row B are arranged into a nozzle group B1,
wherein the nozzle group B1 comprises some of the nozzles B,
wherein the nozzle group A1 and the nozzle group B1 are aligned along the second direction,
wherein the nozzles C of the nozzle row C are arranged into a nozzle group C,
wherein the nozzle group C comprises some of the nozzles C,
wherein the nozzle group A2 and a portion of the nozzle group C are aligned along the second direction,
wherein the nozzles D of the nozzle row D are arranged into a nozzle group D2,
wherein the nozzle group D2 of the nozzle row D comprises some of the nozzles D,
wherein the nozzle group A2 and the nozzle group D2 are aligned along the second direction,
wherein the nozzles E of the nozzle row E are arranged into a nozzle group E1 and a nozzle group E2,
wherein the nozzle group E1 comprises some of the nozzles E,
wherein the nozzle group E2 comprises others of the nozzles E,
wherein the nozzle group A1 and the nozzle group E1 are aligned along the second direction,
wherein the nozzle group A2 and the nozzle group E2 are aligned along the second direction,
wherein the nozzles F of the nozzle row F are arranged into a nozzle group F,
wherein the nozzle group F comprises some of the nozzles F,
wherein the nozzle group A2 and a portion of the nozzle group F are aligned along the second direction,
wherein the nozzle group C and the nozzle group F are aligned along the second direction,
wherein the controller is configured to control:
the nozzle group A1 to eject fluid at an average usage rate A1 that is an average of usage rates of the some of nozzles A comprising the nozzle group A1;
the nozzle group A2 to eject fluid at an average usage rate A2 that is an average of usage rates of the others of nozzles A comprising the nozzle group A2;
the nozzle group B1 to eject fluid at an average usage rate B1 that is an average of usage rates of the some of nozzles B comprising the nozzle group B1;
the nozzle group C to eject fluid at an average usage rate C that is an average of usage rates of the some of nozzles C comprising the nozzle group C;
the nozzle group D2 to eject fluid at an average usage rate D2 that is an average of usage rates of the some of nozzles D comprising the nozzle group D2;
the nozzle group E1 to eject fluid at an average usage rate E1 that is an average of usage rates of the some of nozzles E comprising the nozzle group E1;
the nozzle group E2 to eject fluid at an average usage rate E2 that is an average of usage rates of the others of nozzles E comprising the nozzle group E2; and
the nozzle group F to eject fluid at an average usage rate F that is an average of usage rates of the some of the nozzles F comprising the nozzle group F,
wherein the average usage rate A2 is smaller than the average usage rate A1,
wherein the average usage rate B1 is smaller than the average usage rate A1,
wherein the average usage rate C is smaller than the average usage rate A1,
wherein the average usage rate D2 is smaller than the average usage rate E2,
wherein the average usage rate E1 is smaller than the average usage rate E2, and
wherein the average usage rate F is smaller than the average usage rate E2.

13. A fluid ejection apparatus, comprising:
a nozzle row A comprising nozzles A arranged along the first direction from a first end nozzle of the nozzle row A in a first direction towards a second end nozzle of the nozzle row A in the first direction;

a nozzle row C comprising nozzles C arranged along the first direction, each of the nozzles C is aligned with a different one of the nozzles A in a second direction orthogonal to the first direction, respectively;

a nozzle row D comprising nozzles D arranged along the first direction from a third end nozzle of the nozzle row D in the first direction towards a fourth end nozzle of the nozzle row D in the first direction;

a nozzle row F comprising nozzles F arranged along the first direction, each of the nozzles F is aligned with a different one of the nozzles D in the second direction, respectively, a controller configured to control ejections of fluid from the nozzles A, the nozzles C, the nozzles D and the nozzles F, wherein the nozzles A of the nozzle row A are arranged into a nozzle group A1 and a nozzle group A2, wherein the nozzle group A1 comprises some of the nozzles A, wherein the nozzle group A2 comprises others of the nozzles A, wherein the nozzle group A1 is positioned between the nozzle group A2 and the center of the nozzle row A in the first direction, wherein the nozzles C of the nozzle row C are arranged into a nozzle group C, wherein the nozzle group C comprises some of the nozzles C, wherein the nozzle group A1 and a portion of the nozzle group C are aligned along the second direction, wherein the nozzle group A2 and an another portion of the nozzle group C are aligned along the second direction, wherein the nozzles D of the nozzle row D are arranged into a nozzle group D2, wherein the nozzle group D2 of the nozzle row D comprises some of the nozzles D, wherein the nozzle group A2 and the nozzle group D2 are aligned along the second direction, wherein the nozzles F of the nozzle row F are arranged into a nozzle group F, wherein the nozzle group F comprises some of the nozzles F, wherein the nozzle group A1 and a portion of the nozzle group F are aligned along the second direction, wherein the nozzle group A2 and an another portion of the nozzle group F are aligned along the second direction, wherein the nozzle group C and the nozzle group F are aligned along the second direction, wherein the controller is configured to control:
  the nozzle group A1 to eject fluid at an average usage rate A1 that is an average of usage rates of the some of nozzles A comprising the nozzle group A1;
  the nozzle group A2 to eject fluid at an average usage rate A2 that is an average of usage rates of the others of nozzles A comprising the nozzle group A2;
  the nozzle group C to eject fluid at an average usage rate C that is an average of usage rates of the some of nozzles C comprising the nozzle group C;
  the nozzle group D2 to eject fluid at an average usage rate D2 that is an average of usage rates of the some of nozzles D comprising the nozzle group D2; and
  the nozzle group F to eject fluid at an average usage rate F that is an average of usage rates of the some of the nozzles F comprising the nozzle group F, wherein the average usage rate A2 is smaller than the average usage rate A1, wherein the average usage rate C is smaller than the average usage rate A1, wherein the average usage rate D2 is smaller than the average usage rate A1, wherein the average usage rate F is smaller than the average usage rate A1.

* * * * *